US010242032B2

(12) United States Patent
Sundaresan et al.

(10) Patent No.: US 10,242,032 B2
(45) Date of Patent: Mar. 26, 2019

(54) VIRTUAL WORLD SYSTEM SUPPORTING A CONSUMER EXPERIENCE

(71) Applicant: eBay Inc., San Jose, CA (US)

(72) Inventors: Neelakantan Sundaresan, Mountain View, CA (US); Evan Graziano, Worcester, MA (US); Joshua Jamilkowski, Worcester, MA (US); Zachary Kamsler, Sudbury, MA (US); Benjamin Kidder, Barre, VT (US); Thomas Peterson, Berlin, MA (US)

(73) Assignee: eBay Inc., San Jose, CA (US)

( * ) Notice: Subject to any disclaimer, the term of this patent is extended or adjusted under 35 U.S.C. 154(b) by 701 days.

(21) Appl. No.: 14/846,603

(22) Filed: Sep. 4, 2015

(65) Prior Publication Data

US 2015/0379046 A1 Dec. 31, 2015

Related U.S. Application Data

(62) Division of application No. 12/346,740, filed on Dec. 30, 2008.

(60) Provisional application No. 61/034,137, filed on Mar. 5, 2008.

(51) Int. Cl.
*G06F 17/30* (2006.01)
*G06F 3/0481* (2013.01)

(52) U.S. Cl.
CPC .... *G06F 17/30259* (2013.01); *G06F 3/04815* (2013.01)

(58) Field of Classification Search
CPC .................. G06F 17/30259; G06F 3/04815
See application file for complete search history.

(56) References Cited

U.S. PATENT DOCUMENTS

| 6,026,376 | A | 2/2000 | Kenney |
| 6,981,040 | B1 | 12/2005 | Konig et al. |
| 7,366,721 | B1 | 4/2008 | Bennett et al. |
| 7,660,749 | B2 | 2/2010 | Koski |
| 2001/0049635 | A1 | 12/2001 | Chung |
| 2002/0077927 | A1 | 6/2002 | Lasnier et al. |
| 2002/0113809 | A1 | 8/2002 | Akazawa et al. |

(Continued)

OTHER PUBLICATIONS

Google Operating System "Google Image Labeler", Sep. 1, 2006 2 pages (Year: 2006).*

(Continued)

*Primary Examiner* — Andrea N Long
(74) *Attorney, Agent, or Firm* — Wolfe-SBMC

(57) ABSTRACT

A system and method for creating a virtual world for supporting a consumer experience is disclosed. The apparatus in an example embodiment includes providing access to a database of item listing categories, each item listing category in the database having an associated link to a source for physical items corresponding to the item listing category; generating an image of a virtual store in a three-dimensional (3D) virtual environment; populating the virtual store with at least one first object representing an item listing category; receiving a signal indicative of user interaction with the at least one first object; and using the associated link to re-direct the user to the source for physical items corresponding to the item listing category represented by the at least one first object with which the user interacted.

20 Claims, 17 Drawing Sheets

Communication Between Game Objects

(56) References Cited

U.S. PATENT DOCUMENTS

| | | | |
|---|---|---|---|
| 2002/0188551 A1 | 12/2002 | Grove et al. | |
| 2003/0040962 A1 | 2/2003 | Lewis | |
| 2003/0043144 A1 | 3/2003 | Pundarika et al. | |
| 2004/0030490 A1* | 2/2004 | Hegedus | G01C 21/343 701/532 |
| 2005/0160141 A1 | 7/2005 | Galley et al. | |
| 2005/0177463 A1 | 8/2005 | Crutchfield, Jr. et al. | |
| 2005/0234779 A1 | 10/2005 | Chiu et al. | |
| 2005/0253840 A1 | 11/2005 | Kwon | |
| 2007/0033531 A1 | 2/2007 | Marsh | |
| 2008/0033773 A1 | 2/2008 | Brazell | |
| 2008/0040324 A1 | 2/2008 | Sadri et al. | |
| 2008/0091549 A1* | 4/2008 | Chang | G06Q 30/02 705/14.66 |
| 2008/0140504 A1 | 6/2008 | Hyder et al. | |
| 2008/0195507 A1 | 8/2008 | Ratnakar | |
| 2008/0288325 A1 | 11/2008 | Pavlov | |
| 2009/0019008 A1 | 1/2009 | Moore et al. | |
| 2010/0205043 A1 | 8/2010 | Edwards | |

OTHER PUBLICATIONS

"ActionScript 3.0 overview", http://www.adobe.com/devnet/actionscript/articles/actionscript3_overview.html, ActionScript Article, (2008), 4 pgs.
"ActionScript Technology Center", http://www.adobe.com/devnet/actionscript/, (2008), 7 pgs.
"Adobe Flash CS3 Professional: Features", http://www.adobe.com/products/flash/features/, Adobe Systems Incorporated, (2008), 1 pg.
"U.S. Appl. No. 12/346,740, Advisory Action dated Nov. 27, 2013", 3 pgs.
"U.S. Appl. No. 12/346,740, Final Office Action dated May 25, 2012", 12 pgs.
"U.S. Appl. No. 12/346,740, Final Office Action dated Sep. 19, 2013", 14 pgs.
"U.S. Appl. No. 12/346,740, Final Office Action dated Dec. 1, 2014", 14 pgs.
"U.S. Appl. No. 12/346,740, Non Final Office Action dated Mar. 7, 2014", 14 pgs.
"U.S. Appl. No. 12/346,740, Non Final Office Action dated Sep. 23, 2011", 15 pgs.
"U.S. Appl. No. 12/346,740, Non Final Office Action dated Dec. 13, 2012", 15 pgs.
"U.S. Appl. No. 12/346,740, Response filed Jan. 23, 2012 to Non Final Office Action dated Sep. 23, 2011", 10 pgs.
"U.S. Appl. No. 12/346,740, Response filed Mar. 2, 2015 to Final Office Action dated Dec. 1, 2014", 15 pgs.
"U.S. Appl. No. 12/346,740, Response filed May 13, 2013 to Non Final Office Action dated Dec. 13, 2012", 17 pgs.
"U.S. Appl. No. 12/346,740, Response filed Aug. 7, 2014 to Non Final Office Action dated Mar. 7, 2014", 15 pgs.
"U.S. Appl. No. 12/346,740, Response filed Sep. 25, 2012 to Final Office Action dated May 25, 2012", 11 pgs.
"U.S. Appl. No. 12/346,740, Response filed Nov. 19, 2013 to Final Office Action dated Sep. 19, 2013", 10 pgs.
"Box2DFlashAS3 1.4.3", http://box2dflash.sourceforge.net/, (Downloaded Mar. 6, 2008), 1 pg.
"Building—Second Life", http://secondlife.com/whatis/building.php, Linden Research, Inc., (2008), 2 pgs.
"Business Opportunities—Second Life", http://secondlife.com/whatis/businesses.php, Linden Research, Inc., (2008), 3 pgs.
"Circuit City enters Second Life", CNNMoney, (Dec. 15, 2006), 2 pgs.
"Communicating with Others—Second Life", http://secondlife.com/app/help/basic/communication.php, (Downloaded Mar. 6, 2008), 2 pgs.
"Create an Avatar—Second Life", http://secondlife.com/whatis/avatar.php, Linden Research, Inc., (2008), 2 pgs.

"EBay Shopping Web Services", http://developer.ebay.com/products/shopping/, eBay Developers Program, (2007), 3 pgs.
"ESP Game", http://en.wikipedia.org/wiki/ESP_Game, From Wikipedia, the free encyclopedia, (Dec. 13, 2007), 2 pgs.
"Explore—Second Life", http://secondlife.com/whatis/explore.php, Linden Research, Inc., (2008), 2 pgs.
"Get Flash Player 9", http://www.adobe.com/products/flashplayer/, Adobe Systems Incorporated, (2008), 1 pg.
"Google Image Labeler", http://images.google.com/imagelabeler/, (2007), 1 pg.
"Google Image Labeler", http://googlesystem.blogspot.com/2006/09/google-image-labeler.html, (Sep. 1, 2006), 5 pgs.
"Google Image Labeler", http://en.wikipedia.org/wiki/Google_Image_Labeler, From Wikipedia, the free encyclopedia, (Jan. 29, 2008), 4 pgs.
"Google Images Labeler: Google's Challenge to Flickr?", http://blog.searchenginewatch.com/blog/060901-094309, (Sep. 1, 2006), 1 pg.
"GreenSock: TweenLite (AS3)—A Lightweight (3K) and FAST Tweening Engine", http://blog.greensock.com/tweenliteas3, (Mar. 5, 2008), 25 pgs.
"Have Fun—Second Life", http://secondlife.com/whatis/fun.php, Linden Research, Inc., (2008), 2 pgs.
"IBM to Build Virtual Stores in 'Second Life' for Sears Circuit City", (Jan. 9, 2007), 3 pgs.
"Improved Amazon Shopping in Second Life", Amazon Web Service Blog, (Aug. 10, 2006), 12 pgs.
"IP and Business: Second Life—Brand Promotion and Unauthorized Trademark Use in Virtual Worlds", WIPO Magazine, http://www.wipo.int/wipo_magazine/en/2007/06/article_0004.html, (Nov. 2007), 3 pgs.
"Land Pricing & Use Fees—Second Life", http://secondlife.com/whatis/landpricing.php, Linden Research, Inc., (2008), 2 pgs.
"llLoadURL", http://wiki.secondlife.com/wiki/llLoadURL, (Nov. 12, 2007), 1 pg.
"Own Virtual Land—Second Life", http://secondlife.com/whatis/land.php, Linden Research, Inc., (2008), 2 pgs.
"Peekaboom: The Basics: Peeking and Booming", http://www.peekaboom.org/howtoplay.html, Carnegie Mellon University, (2005), 2 pgs.
"Scripting—Second Life", http://secondlife.com/whatis/scripting.php, Linden Research, Inc., (2008), 2 pgs.
"The ESP Game: Instructions", http://www.espgame.org/instructions.html, Carnegie Mellon University, (2005), 2 pgs.
"The Marketplace—Second Life", http://secondlife.com/whatis/marketplace.php, Linden Research, Inc., (2008), 2 pgs.
"The World—Second Life", http://secondlife.com/whatis/world.php, Linden Research, Inc., (2008), 2 pgs.
"What is Second Life?—Second Life", http://secondlife.com/whatis/, Linden Research, Inc., (2008), 2 pgs.
Anthony, Rhind McInsight, et al., "Marketing in Second Life and Other Virtual Worlds", (Oct. 2007), 43 pgs.
Arrington, Michael, "Google Image Labeler Uses Human Labor", http://www.techcrunch.com/2006/09/01/google-image-labeler/, (Sep. 1, 2006), 11 pgs.
Chapman, Katy, "Zooming in on Texture Maping", A look at the latest development in 3D product visualization tools, (Feb. 2001), 1-4.
Cui, Jingyu, et al., "EasyAlbum: An Interactive Photo Annotation System Based on Face Clustering and Re-ranking", Proceedings of the SIGCHI Conference on Human Factors in Computing Systems, San Jose, California, USA, (2007), 367-376.
Fry, Eileen, et al., "Tagging and User-Contributed Metadata Brown Bag", Indiana University, School of Library and Information Science, Digital Library Brown Bag Talk Series, (Oct. 18, 2006), 3 pgs.
Law, Edith, et al., "TagATune: A Game for Music and Sound Annotation", 8th International Conference on Music Information Retrieval, (Sep. 23-27, 2007), 4 pgs.
Maney, Kevin, "The king of alter egos is surprisingly humble guy: Creator of Second Life's goal? Just to reach people", USA Today, http://www.usatoday.com/printedition/money/20070205/secondlife_cover.art.htm, (Feb. 5, 2007), 3 pgs.

(56) References Cited

OTHER PUBLICATIONS

Mansfield, Ron, "eBay Rolls out Custome Categories for Stores", EcommerceBytes.com, (Mar. 19, 2006), 1-3.

O'Reilly, Tim, "Google Image Labeler, the ESP Game, and Human-Computer Symbiosis", http://radar.oreilly.com/archives/2006/09/google-image-labeler-the-esp-g.html, (Sep. 3, 2006), 13 pgs.

Su, Qi, et al., "InternetÂ-Scale Collection of HumanÂReviewed Data", Proceedings of the 16th International Conference on World Wide Web, (2007), 231-240.

Von Ahn, Luis, et al., "Labeling Images with a Computer Game", Proceedings of the SIGCHI Conference on Human Factors in Computing Systems, (2004), 319-326.

Wilson, Daniel, "Using Context History for Data Collection in the Home", 1st International Workshop on Exploiting Context Histories in Smart Environments (ECHISE-2005), (2005), 1-4.

\* cited by examiner

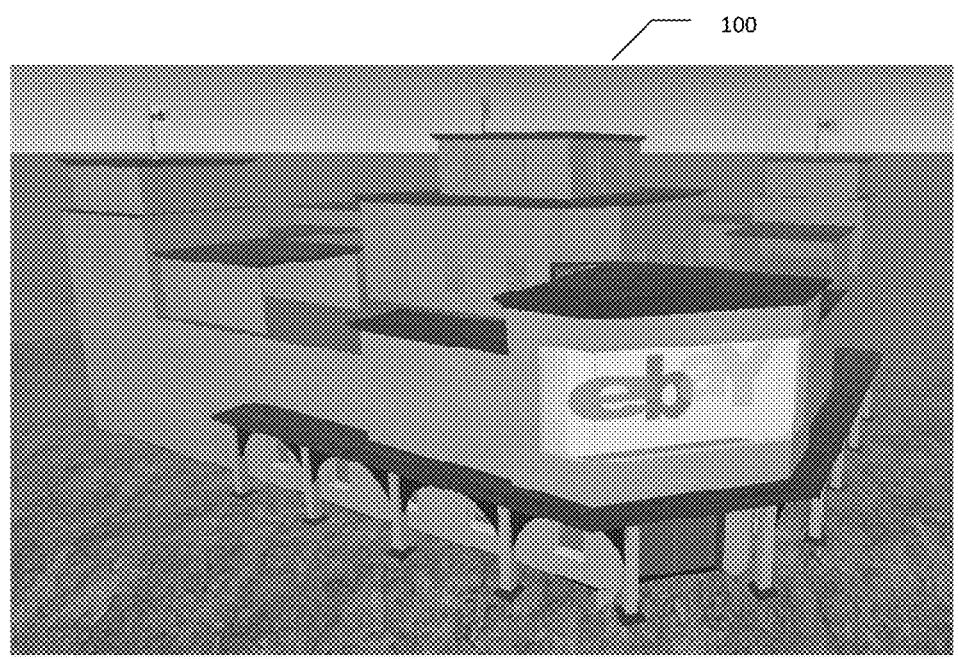
Figure 1: The eBay Store in Second Life

Figure 2: Inside the eBay Store

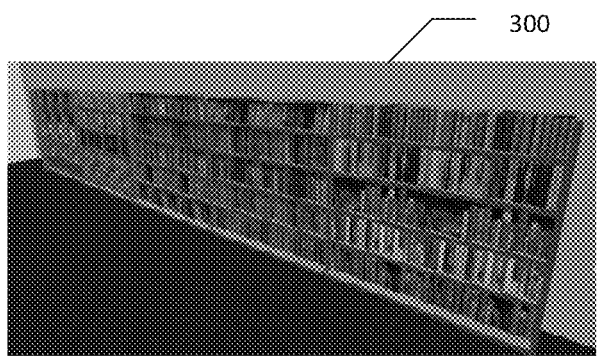
Figure 3: A bookshelf in the eBay Store

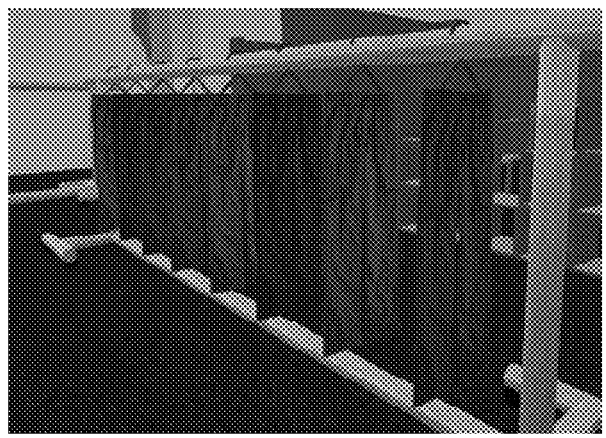
Figure 4: Clothing rack in the eBay Store

```
default
{
    touch_start(integer num_detected)
    {
        key gAvatarKey = llDetectedKey(0);
        llLoadURL(gAvatarKey,
        "View the offical Second Life
website.",
        "http://www.secondlife.com");
    }
}
```

— 500

— 501
— 502

Figure 5: Example of llLoadURL()

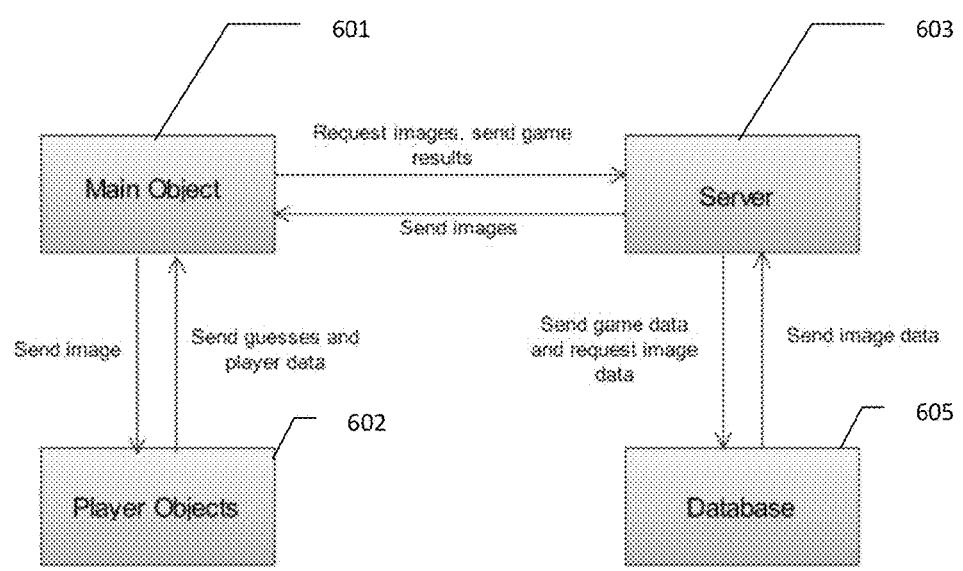
Figure 6: Communication Between Game Objects

```
link_message() {
  if(playersConnected == 0) {
    // add first player
  }
  else if (playersConnected == 1){
    // add second player
  }
  else{
    // handle input
  }
}
```
/— 701

Figure 7: Example of link_message() Function

```
if ( isset ( $_GET['end'] ) )
{
  $player1 = $_GET['p1Name'];
  $player2 = $_GET['p2Name'];
  $score = $_GET['score'];
}
```

Figure 8: Example of $_GET

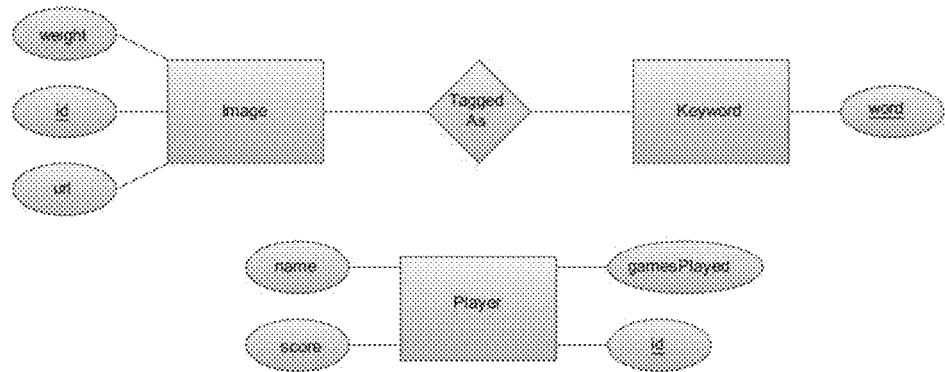
Figure 9: ER Model of the TaggerSL Database

Figure 10: Player Table (1000) in the Tagger Database

| Variable: | name | score | gamesPlayed |
|---|---|---|---|
| Properties: | varchar(32) | int(11) | int(11) |
|  |  | Default = 0 | Default = 0 |

Figure 11: Image Table (1001) in the Tagger Database

| Variable: | id | url | taggedTime |
|---|---|---|---|
| Properties | int(11) | varchar(100) | timestamp |

Figure 12: Keyword Table (1002) in the Tagger Database

| Variable: | id | keyword | weight |
|---|---|---|---|
| Properties: | int(11) | varchar(30) | int(11) |
|  |  |  | default = 1 |

Figure 13: Search results for "hat"

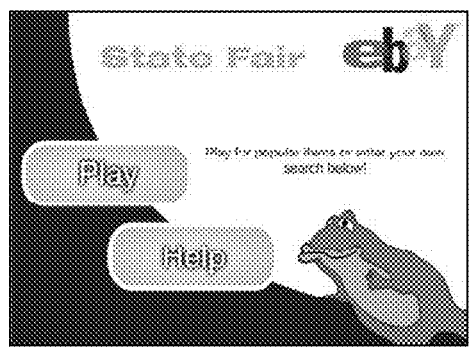
Figure 14: The State Fair Menu

VIRTUAL WORLD SYSTEM SUPPORTING A CONSUMER EXPERIENCE

RELATED APPLICATIONS

This application is a divisional of and claims the benefit of priority under to U.S. patent application Ser. No. 12/346,740, filed on Dec. 30, 2008, entitled "VIRTUAL WORLD SYSTEM SUPPORTING A CONSUMER EXPERIENCE", which claims the benefit of priority under to U.S. Provisional Patent Application Ser. No. 61/034,137, filed Mar. 5, 2008, entitled "VIRTUAL WORLD SYSTEM", the benefit of priority of each of which is claimed hereby, and each of which are incorporated by reference herein in its entirety.

BACKGROUND

Copyright Notice

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2007-2008, eBay Inc., All Rights Reserved.

TECHNICAL FIELD

This disclosure relates to methods and systems supporting computing and data processing systems. More particularly, a system and method for creating a virtual world for supporting a consumer experience is described.

RELATED ART

Conventional systems, like Amazon.com, can use a buyer's previously purchased product or product category/genre to suggest new products in a same or similar category/genre for the user. However, these prior systems are typically one-dimensional. That is, one-dimensional input (e.g. product category/genre) leads to one-dimensional output (e.g. new products in a same or similar category/genre). These conventional systems cannot provide multi-dimensional context analysis to provide a multi-dimensional output based on (customized from) a collection of activity from a community of users gathered over time.

U.S. Pat. No. 6,981,040 describes a method for providing automatic, personalized information services to a computer user including the following steps: transparently monitoring user interactions with data during normal use of the computer; updating user-specific data files including a set of user-related documents; estimating parameters of a learning machine that define a User Model specific to the user, using the user-specific data files; analyzing a document to identify its properties; estimating the probability that the user is interested in the document by applying the document properties to the parameters of the User Model; and providing personalized services based on the estimated probability. Personalized services include personalized searches that return only documents of interest to the user, personalized crawling for maintaining an index of documents of interest to the user; personalized navigation that recommends interesting documents that are hyperlinked to documents currently being viewed; and personalized news, in which a third party server customized its interaction with the user.

Thus, a system and method for creating a virtual world for supporting a consumer experience are needed.

BRIEF DESCRIPTION OF THE DRAWINGS

Embodiments illustrated by way of example and not limitation in the figures of the accompanying drawings, in which:

FIG. 1 illustrates a particular embodiment of a virtual store in a virtual world.

FIG. 1 illustrates a particular example embodiment of a virtual store in a virtual world.

FIG. 2 illustrates an example embodiment of the inside of the virtual store, shown in a particular configuration.

FIG. 3 illustrates an example embodiment of the texturing of objects or items inside of the virtual store.

FIG. 4 illustrates another example embodiment of the texturing of objects or items inside of the virtual store.

FIG. 5 illustrates an example embodiment of the scripting for objects or items inside of the virtual store.

FIG. 6 illustrates an example embodiment of functionality broken up into separate objects.

FIG. 7 illustrates an example of the link_message( ) function for a particular embodiment.

FIG. 8 illustrates an example code segment that shows a simple check on what the game state is and then puts the variables from the "$_GET" array into easier to use local variables.

FIG. 9 illustrates a model of our database design in an example embodiment.

FIGS. 10-12 illustrate the tables of our database design in an example embodiment.

FIG. 13 illustrates the search results page in an example embodiment for a search query of the text string, "hat."

FIG. 14 illustrates an example of the State Fair menu screen.

DETAILED DESCRIPTION

Figure 15:
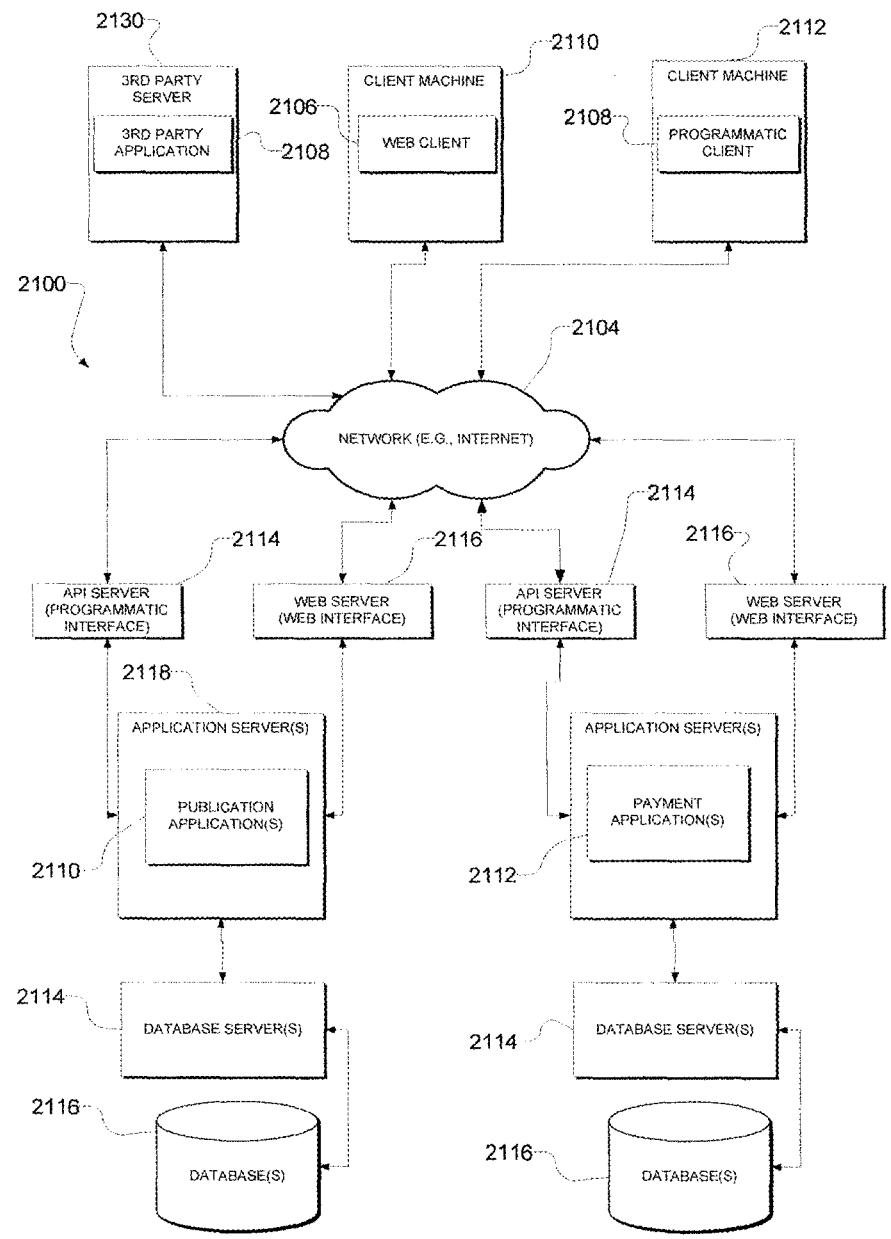
FIG. 15 is a network diagram depicting a client-server system 2100, within which one example embodiment may be deployed.

In the following description, for purposes of explanation, numerous specific details are set forth in order to provide a thorough understanding of some example embodiments. It will be evident, however, to one skilled in the art that the present invention may be practiced without these specific details.

According to an example embodiment, there is provided a transaction system (e.g., a store) within a virtual world (e.g. Second Life) that provides a new method for browsing various categories (e.g., from the eBay website) We have also created an image-tagger game, TaggerSL, which uses human computation to outsource image recognition from computers (where image recognition processes are difficult and expensive) to humans (who will recognize and tag images for fun). Finally, our team created a series of mini-games in Flash that provide another new and fun way to browse publication data (e.g., eBay's item listings). We linked all of these sub-projects through a virtual world (e.g., Second Life).

Second Life

Outside the realms of the mainstream game industry, there exist virtual worlds which allow users the freedom to do what they wish and to socialize with people from around the world. One of the most popular of these is Second Life which has a strong following from both its users and the media According to the Second Life website, Second Life is an Internet-based, 'three-dimensional world entirely created by its residents", or users. It was developed by Linden Research Inc., also known as Linden Lab, and was released in 2003. In Second Life, users are able to interact with other users through their avatar which the user themselves can design using the design features included in the Second Life Viewer. The Second Life Viewer is the client which the users utilize to connect and interact with Second Life. The user's avatar represents them in the game and can be designed to look like themselves or however they want themselves to look like. In this Second Life environment users can "discover the thousands of ways to have fun". This can include playing games, going to dance clubs, shopping, going to events, etc.

The inspiration for Second Life came from the "cyberpunk" literary movement. Author Neal Stephenson had a large influence on the game with his novel Snow Crash which "takes place across two worlds: the real world, and the global, highly realistic online space called the Metaverse." Philip Rosedale, Linden Lab's CEO, received the book from his wife and once technology caught up to where Rosedale felt his vision could be conceived, Second Life was created as representation of the Metaverse from Stephenson's novel. As of November 2007, Second Life was home to a massive following with over 9 million registered users despite competition from There, Active World, and Red Light Center, Second Life is certainly here to stay.

One of the most notable features of Second Life is that it is constantly changing. The total membership is constantly increasing with thousands of new residents joining up each day allowing more and more interaction between new users and an ever increasing selection of user created content.

Second Life prides allows for personal expression, so with the creation of an avatar Second Life ensures that each resident is provided just that. Basic avatars provided are human in appearance, but allow for an almost endless amount of modifications that can be made, ranging from sex, to skin color, to body shape and size. Clothing may also be created to user specification either through this same customization process or separately as individual items.

In Second Life, avatars may be completely creative or can be made to resemble the person they represent. Although it is only possible to have one avatar per account, residents are allowed to pay a small fee to maintain multiple accounts, or may simply create different costumes for their avatar, which allows for a wide array of shapes, sizes, and genders.

When entering the world of Second Life, it can be a bit overwhelming for new residents the first time out. Therefore, Linden Lab has developed a few tools to help accustom residents with the ever-expanding world, while allowing them to explore it in a simple and efficient manner.

The in-game map allows residents to check out the terrain of their surrounding area, as well as view any other residents that may happen to be located there. Using the map, residents may then click on the green dots being shown for upcoming events' information which may be further explored in the search menu. Here, residents may search for events that they have heard of, or simply look for people, places, or things, that are related to a topic of interest. After searching, residents are provided with a full description of their search results and given the option to teleport to its location.

As users may notice first time in, to get the full Second Life experience, many residents purchase land for their accounts. By owning land residents are allowed to build, display, and store virtual creations, as well as host events and businesses. The cost of land is $9.95, the price of a premium account which includes 512 $m^2$ of land, plus a Land Use Fee proportional to any additional amount you may wish to own.

Users also have the option of buying a Private Estate, which has a completely different set of regulations and pricing. The initial purchase may only be made by one resident, who is termed the Estate Owner, who may then appoint Estate or Region Managers. These managers do not need to be premium members, and will often pay a Land Use Fee to the Owner him or herself, who still maintains the ability to do what he or she pleases with the land.

The first thing that many residents notice when entering the world of Second Life is the incredibly diverse environments and objects strewn across the map. This is due in part to the fact that everything in Second Life is resident-created. Using both modeling and scripting techniques, residents can create anything from a new suit to impress all around, to a rocket car used to patrol the streets of Second Life. This created content may then be taken a step further and either be given out to any resident who wishes it, or may be sold to the creator for a profit.

In order to provide ease with content creation, Linden Lab has implemented several tools that may be utilized to build content to resident specification. This includes an internal building system that allows for the manipulation of geometric primitives in a simple interface. Residents may modify, stretch, texture, and link these shapes to others to create just about anything their hearts desire. For a small fee, residents are able to import their own textures as .jpegs and other standard graphic files into Second Life that only further enhances resident-created content. Second Life also provides users with the ability to collaboratively create objects, simultaneously or at different times, and "imbue them with Havok-powered physics so they respond to gravity, inertia, propulsion, and wind from the in-world weather system. Objects are also able to cast shadows and are illuminated by the in-world sun." If unfamiliar with this system, however, basic to expert instruction is offered for free by veteran residents and Linden Lab staff in-world.

After building an object, it is then possible to add behaviors to it through the use of the easy-to-learn Linden Script Language, or LSL. This language is "an internal, event-driven, C/Java-style language which allows the user to control object and avatar behavior, up to and including mini-games and other complex programs." Much like with modeling, basic to expert instruction is offered in-world for free by veteran residents and Linden Lab staff.

Once familiarized with the world of Second Life, many residents take it upon themselves to make a small living on user-created services or content. Similar to how users are able to buy in-game currency, known as Linden Dollars, users who "have amassed large amounts of Linden Dollars" are able to match up with residents at LindeX, Second Life's official Linden Dollar Exchange, or at other third-party exchanges to sell their hard-earned "cash" for actual money.

The ability to do so has not only prompted increased content creation, but also the integration of businesses into the world of Second Life. Some examples of resident creativity, when it comes to sales, includes pet manufacturers, tattooists, fashion designers, architects, XML coders, bodyguards, private investigators, and even hug makers.

Human Computation

Human computation is a technique in which a computational process is outsourced to humans in order to achieve results not easily attainable by computers. One field such endeavor is image recognition, a task that humans are able to perform effortlessly. By providing humans with an incentive for performing the task, you are able to use them to solve a problem which otherwise would more than likely not be able to be solved in a timely manner. Incentives could be monetary compensation, as Amazon's Mechanical Turk demonstrated, or by providing the user with fun or competition, found in games like the ESP Game or Google Image Labeler.

ESP Game

ESP Game is a two player online game created by Luis von Ahn of Carnegie Mellon University that uses the principles of human computation as the basis for creating a fun and compelling game. In the game, two randomly paired users are shown an image which they must then describe using keywords or tags. Communication between the users is not possible and at no point during the game do the users know who their partner is. When the users match a keyword, a new image is displayed. Users are able to guess as many keywords on an image as they please until they match with their partner. The goal of the game is to tag as many images as possible within two and a half minutes, a large number of bonus points being awarded if the makeshift team is able to agree on 15 images. In order to make the keywords of an image more precise over time, taboo words are used to restrict the users from inputting commonly used keywords. This forces the users to describe the images using more concise keywords to avoid tagging every image with a broad generalization.

Google Image Labeler

The ESP Game technology was licensed by Google in order to create the Google Image Labeler. The game follows the same basic rules as the ESP Game it is based upon but with a few differences, namely that you have a two minute period in which you can tag as many images as possible and you receive more points for matches with more descriptive labels. By using the Image Labeler to harness the power of human computation, the Google Image Search is able to provide more accurate results for users.

Flash

We authored our example Mini-Games to run in the Adobe Flash Player. As a result, we have provided a summary of our research into the Flash Player, the CS3 authoring environment, creating visual content for Flash, and creating scripts for Flash-based games.

Flash Player

Flash movies are run by the Flash Player, a common plug-in for Internet browser applications. Adobe's website indicates that the player is currently installed on more than "800 million Internet-connected desktops and mobile devices." The player allows users to view and interact with Flash-based content on websites, including video, graphics, and animation. The player also provides a convenient and widely used interface for developers to create media and applications for.

Flash CS3

Adobe also maintains a series of tools that support professional Flash developers. The full suite of Flash creation tools, Flash CS3, supports importing from other popular Adobe tools, such as Photoshop and Illustrator, a frame based timeline for animation, a development environment for the Action Script scripting language, MP3-format audio, and a set of drawing tools for graphic-media creation.

Vector-Based Graphics

Many of the visual elements used in Flash movies involve vector-based graphics. Rather than using per-pixel bitmaps with compression, Flash movies use vectors to define shapes and other visual elements. For example, a rectangle in flash is stored and manipulated as a series of points connected in a certain order, rather than as a collection of pixels. Vector-based graphic are resolution independent, so they can be scaled to any size and drawn without loss of detail.

ActionScript

ActionScript is a programming language allows developers to add scripting and code to their Flash projects. The language is object-oriented, and is based on the ECMAScript standard (ECMAScript is a scripting language, standardized by Ecma International in the ECMA-262 specification). The version in a particular embodiment uses, ActionScript 3.0, supports runtime exceptions, type checking, sealed (non-dynamic) classes, method closure (delegation), and namespaces. These features allow someone to create object-oriented scripts for our example Mini-Games, as well as a common library to use between those games.

eBay Island

An example embodiment of the present invention was implemented as a virtual store within a virtual world. To this end, the eBay store is a virtual representation of eBay's ever-expanding auction website, accessible from the virtual 3D environment known as Second Life. In the store, users are able to browse the various search categories of eBay's auctions, much like they would aisles of a typical department store. Once they choose an item that they would like to purchase, they are taken to eBay's website where a search is performed on the particular category that they have selected.

Another embodiment may be implemented as an online auction house, as an alternative or an addition to a virtual store. Regardless, both example embodiments can use a piece of virtual land in a virtual world (e.g. Second Life) and both can use virtual housing of sorts to attract users. A difference between the embodiments is primarily with respect to functionality. The online auction house would allow users to create and participate in auctions for either real world items, virtual (e.g., Second Life) items, or both. The eBay store, however, can provide a consumer experience in the form of a department store, granting users the ability to choose items around the store that they would like to bid on and either provide direct access to an auction or provide a link to the eBay website where they would be allowed to browse many similar auctions.

Unsure of which to choose, we then turned to Second Life to research its capabilities, as well as its reliability, regarding the options that we had provided. We found that with the auction house, Second Life was not as stable as we would have desired and could result in unfair auctions, disconnects, and an excessive amount of problems for eBay. Therefore, we decided to proceed with the eBay store as a chosen embodiment. However, due to similar constraints, as well as limitations set forth regarding the linking of specific auctions, we decided solely on providing links from the in-store items to category searches on the eBay website. It will however be appreciated that, on an alternative virtual world platform, or as Second Life addresses the issues with the platform described above, the features described in this document could be implemented within the context of an auction house, or another transaction or commerce platform.

Categories

Before we could begin building, however, it was very important that we first decide how we would want to categorize the ever-growing list of auctions on the eBay site. eBay has already created a series of categories for searching purposes, and, considering that the eBay store was in one sense a 3D representation of the website, we felt that these series of categories would be appropriate. Thus, a set of categories can be generated that identify types or classifications of products or services that consumers may purchase, bid upon, rent, least, sample, reserve, or view. The categories can be in varying levels of specificity and may be hierarchically arranged.

Once we had established this list of categories, we were then left with the decision as to what would be the best way to represent them in the form of 3D models. We decided to take a few of the more generic items (TVs and DVD Players for electronics, Basketballs and Baseball Bats for sporting goods, etc) and model them so that users would be sure to know exactly what category they would be searching for. However, as to avoid any confusion, we also provided a small popup once an item was selected that would signify which category the user was in fact interacting with.

Store Blueprints

Once we had the categories set, we then had to decide how we would want the layout of the store to look. Since eBay's categories consisted of products sold at a variety of stores, we decided to look at a few of them as reference.

Model Assets

Once the layout was prepared, it was then time to begin modeling the store. For this task, we relied on Second Life's in-world building system, creating the base structure from a series of primitives (prims), Second Life's custom building blocks. Once we had somewhere to house all of the items, we then began to systematically model the rest of the assets, alternating between functioning, linkable items and non-functioning, visual aids such as cash registers that serve more as support models to further immerse users into the 3D environment. It will be apparent to those of ordinary skill in the art that other conventional modeling tools, such as those described below, can be used to build a virtual store in a virtual world.

Although we were able to continue using Second Life's building system for many of these smaller assets, we found it useful to also rely on external software to create many of these models.

Autodesk Maya

Autodesk Maya is a high end 3D graphics and modeling program. For the sake of our project, this meant that it would allow for a greater flexibility while modeling, as well as superior functionality. Whereas Second Life offers the ability to manipulate and combine basic geometric objects to form more complex models, Maya does so in a way that is much less time consuming while still providing a wide array of customization tools. While using Maya, we were able to create many of our models using polygons, rather than Second Life prims (primitives), and, due to its compatibility with a wide array of add-ons, were able to easily import into Second Life for a nominal fee. Autodesk Maya can be found at http://usa.autodesk.com/adsk/servlet/index?siteID=123112&id=7635018.

SLTK Pro

SLTK Pro is an add-on for Autodesk Maya that allows users to create and export models into Second Life. Users are given the ability to either sculpt models using a system similar to that of Second Life, or users can completely forgo this process by utilizing all of Maya's features and then converting to sculpted prims, the native building blocks of Second Life. Once converted, users may then easily import models into Second Life having them automatically backed up in the process. SLTK Pro can be found at http://www.simtools.jp/sltk/en/index.php.

Link to the Website

Once all of the models were in place, the final task was to link each category of items to its corresponding area of the eBay website. By utilizing Second Life's in-world scripting language, LSL or Linden Scripting Language, we were able to provide users with access to the auction site by coding each item so that once interacted with (e.g. a mouseover operation being performed on the item), a pop-up would appear denoting which category the user had in fact selected, and asking whether or not they would like to be taken to the corresponding webpage. If yes, a call is made to launch the user's external web browser, displaying the results of their current query.

In this manner and as described in more detail below, a user can visit a virtual store in a virtual world using a conventional web browser. The virtual store is presented by a virtual store generator as a three-dimensional (3D) image (e.g. an image of a physical 3D store) within a 3D world. Various product or service categories can be shown as 3D virtual objects. The 3D virtual objects can be 3D images of a physical 3D item such as a baseball representing a sports category or a labeled 3D box representing another product or service category. The 3D virtual objects can be arranged on 3D virtual product shelves, racks, rows, aisles, or clusters, in a manner similar to the way physical products are arranged in a conventional physical store. Users of the virtual store can mouseover the 3D virtual objects (e.g. linkable store items) and see pop-up information for the physical product or service represented by the 3D virtual object in proximity to the user's pointing device (cursor). The user can select a 3D virtual object by clicking on the 3D virtual object with the select button on the user's pointing device. When a 3D virtual object in a virtual store is selected, the user's browser can be redirected to a host site or merchant site where the user may purchase, bid upon, rent, least, sample, reserve, or view an image of the physical product or service represented by the selected 3D virtual object. In this manner, the virtual store provides a mapping between the 3D virtual object and the physical product or service represented by the 3D virtual object.

Design and Implementation

As previously mentioned above, much of the eBay store's design and development in a particular embodiment was done in Second Life. Various techniques, that are needed to accomplish our goals, are described in the following sections.

Store Asset

FIG. 1 illustrates a particular example embodiment of a virtual store 100 in a virtual world. As mentioned above, and seen in FIG. 1, the virtual store 100 itself has been modeled in Second Life. Using Second Life's native building blocks, sculpted primitives, we were able to create not only a lower store area, but also an upper roof area. Accessible from both the inside and outside of the store, this roof area is meant to house more of the linkable store items as well as potentially house eBay TaggerSL, which will be discussed in more detail below. It will be apparent to those of ordinary skill in the art that the virtual store 100 can be implemented using a variety of well-known modeling techniques.

FIG. 2 illustrates an example embodiment of the inside of the virtual store 100, shown in a particular configuration. FIG. 2 portrays a series of aisles, several clothing racks, display cases, a home entertainment area, and other non-functioning store accessories placed through a first-hand perspective rather than with pen and paper. Decorating the walls, we have also included banners linking to the example Mini-Games described below.

A final factor that needed to be taken into consideration was texturing for the virtual store. A large portion of texturing was done after the virtual store had already been constructed. The texture of the virtual store and many of its larger features in an example embodiment can be textured in correspondence with the desired host logo colors or other desired colors and textures.

In-Store Assets

After the virtual store was completed, the next step was to stock or populate the store with items from the various product/service categories, as well as visual aids, such as cash registers and candy racks that would add to the appearance of an actual physical store. Due to various constraints set forth by Second Life, we had to utilize various texturing techniques to create a majority of the content before we could then script and link the virtual store items to eBay's website.

Texturing

For many of the in-store items, we found it much more efficient, both in the time it took to create them as well as the amount of space each item consumed, to texture actual images on to sculpted primitives, giving off the appearance of real world items. FIG. 3 illustrates an example embodiment of the texturing of objects or items inside of the virtual store. For example, as shown in FIG. 3, by taking a simple rectangle and texturing a row of books onto the rectangle, we were able to create a realistic representation of a book shelf 300 that did not require the creation of dozens of models, or the manual texturing of each book.

FIG. 4 illustrates another example embodiment of the texturing of objects or items inside of the virtual store. Similar to the technique shown in FIG. 3, in the example of FIG. 4 we used Second Life's support of alpha channels. By using alpha channels we were able to once again conserve time and space by quickly and easily generating items such as shirts and pants, pictured in FIG. 4, that would take a great deal of time to effectively model. To do this, we would once again take simple primitives and apply a single texture with an alpha, or transparency, layer, created in Adobe Photoshop for a particular example embodiment. It will be apparent to those of ordinary skill in the art that other texturing systems can be used. This transparency served to mask the true shape of the object and show only the desired image.

Scripting

FIG. 5 illustrates an example embodiment of the scripting for objects or items inside of the virtual store. After the items in the virtual store were built and textured, it was then time to script each item so that once touched, moused over, selected, or otherwise interacted with by a user (denoted herein as 'touched'), the script corresponding to the touched item would be executed causing the virtual store to generate a pop-up, text box, window, or other display object signifying what the user would be searching for and allowing for him or her to have an external browser launched. In this manner, the user may be directed to a website or other window or display screen corresponding to the touched item to display all of the search results corresponding to the touched item on the website.

In order to implement this scripting technique in an example embodiment, we included the "llLoadURL( )" code 500, illustrated in the example of FIG. 5, for each item for sale, bid, lease, or view in the virtual store by replacing the first string, "View the official Second Life website" 501, with a message displaying the search query for each corresponding item, and replacing the second string, http://www.secondlife.com 502, with the search result Uniform Resource Locator (URL) for each corresponding item. In this manner, a user who touches an item in the virtual store 100 can be automatically directed to a corresponding website or other window or display screen corresponding to the touched virtual item where the user can either purchase, bid on, lease, or view a physical item corresponding to the virtual item shown in the virtual store. Thus, a merchant can generate a virtual store in a virtual world and enable users to purchase, bid on, lease, or view physical items offered by the merchant via the corresponding virtual items shown in the virtual store. Further, aggregator sites that combine product/service offerings from a plurality of merchants/sellers (e.g. eBay), can generate a virtual store in a virtual world and enable users to purchase, bid on, lease, or view physical items offered by any of the plurality of merchants via the corresponding virtual items shown in the virtual store.

Limitations

Throughout the development of the inventive system, we ran into several unexpected limitations that may lead to alternative embodiments. The first of these was the security of Second Life servers, as well as latency issues, as Second Life is widely known for issues with their servers and their somewhat common solution of rolling back various regions, which can be described as reverting the regions back to a previous working state, thereby deleting any changes or additions that had been made in the current state. In a particular embodiment implementing a virtual bidding store or virtual auction house in the Second Life virtual world as described herein, users would need to rely on Second Life's servers to ensure that users were able to fairly participate in an auction as well as guarantee that once a user had won an auction for an item, the winning user would actually receive the item. In order to purchase the item, however, the users would have also been required to log into their eBay accounts, which would have required sending their information over unsecure servers. This could potentially lead to compromised accounts and a series of unneeded troubles for a host implementing a virtual auction house.

The second problem is a limit that Second Life has placed on its Hypertext Transfer Protocol (HTTP) responses. After we decided to create an eBay store in a Second Life embodiment, our first idea was to have each of the in-store items link to actual auctions or searches via an internal browser. However, Second Life limits the maximum size of an HTTP response. Responses from a request are truncated to 2048 characters, and any information past the first 2048 characters is lost. When we tested this with calls to the eBay Application Programming Interface (API), the responses were typically longer than the 2048 character maximum, which meant that some of the response was missing. Since our HTTP requests would be corrupted by this fact, we decided to script each item in the virtual store to make a call to an external web browser so that users would be allowed to fully interact with the website corresponding to the touched item in the virtual store.

eBay TaggerSL

One concern for any virtual store host (e.g. eBay) is the ability of users to find the items for which they are looking. The quality of the keywords associated with items offered by the host/merchant via the virtual store are an important factor affecting this. The better the keywords are the better chance the users will have of quickly finding their items. An example embodiment hopes to aid in this area by using human computation in the form of a game to create better keywords for publication data (e.g., auctions and fixed-price item listings). The result of this desire for better keywords is an implementation of a TaggerSL game, which pairs two players together in a game to tag images with quality keywords. This game in an example embodiment is described in more detail below.

Design & Implementation

An example embodiment (Tagger) seeks to address an inability of computers to effectively tag images and auctions with keywords. Tagger seeks to utilize the cognitive processing power of the human mind to create new keywords, which algorithms could not create. Our implementation of TaggerSL, in a particular example embodiment, was developed within a number of different environments before being merged into a complete solution. We would need to create objects in Second Life using LSL to control the gameplay, an application on a web server using PHP (hypertext pre-processor), and a MySQL database to store information about the images used in the games and the players' statistics. Both the design and implementation will be discussed in this section in order to provide a complete explanation, combining theory and code.

Gameplay

In a particular example embodiment, the functionality of our game was written using LSL scripts within Second Life. Our design changed throughout the project as we encountered several limitations in Second Life. Originally we had all of our functionality stored in one object which controlled the entire game. Our design was event driven, which is what most Second Life scripts are. To play the game the user clicked on the object and when another user clicked on the same object the game started. However, we soon realized that we needed some way to stop users from hearing what their partner was saying. Otherwise, the user could see what their partner was saying as keywords and there would be no secrecy to drive the gameplay. This problem was additionally complicated because Second Life has no way for users to privately communicate with an object and has no way to mute the player unless the player decides to mute him/herself. The only feasible way we saw of accomplishing this was requiring the players to be far enough away from each other that they couldn't hear each other.

After some brainstorming, we realized that we needed to break up the code into separate objects so that the users could not hear each other, but yet can still play the game. To do this, we took the code which received input from the players and moved it to separate objects. These separate objects would send information to the main object which would keep track of all of the game information and do most of the processing. This approach required us to link our objects resulting in the objects that the users interacted with being children of the main object which controlled the game.

After making this large change, we decided to test the distance objects were able to talk to each other. We soon found out that this distance isn't very far, but it is large enough so that users cannot hear each other.

One final aspect of our design was the incorporation of a server and database. Since our scripts in an example embodiment were restricted to 16 kb, this did not leave us with a lot of room to do extra processing, such as connecting to a database or determining what image to use. Instead, our main object sends HTTP requests to our server for a number of different tasks.

FIG. 6 illustrates an example embodiment of functionality broken up into separate objects. As shown in FIG. 6, game functionality of a game generator is separated into a main object 601 and player objects 602. The main object 601 interfaces with a server 603 to get access to a database 605 for data that supports the functionality. The main object 601 also interfaces with player objects 602 to get player data and to send images to the player objects 602.

A goal in our design was to try and keep it simple while also fulfilling all of the requirements of the game. By taking a lot of the processing away from the script, it makes it much easier to understand and quicker to execute.

Over the course of our design, we broke the project up into several pieces which all work together in some way. The TaggerSL main object is the object in Second Life which holds the gameplay information and talks with the server. The TaggerSL player object is an interface between the TaggerSL main object and the player. The server provides the TaggerSL main object with the information it needs and processes any data from the game. Finally, the database stores all of the game data which can be used later on.

TaggerSL Main Object

The main object 601, which controls the overall gameplay, runs using a number of event driven functions and some helper functions to make the design more cohesive. The main object 601 also contains some game state variables which help to keep track of information which can then be sent back to the server. These include the score, the player ids, the lists of keywords, and the different game times To begin with, the game does not do anything until it receives a message from one of the player objects saying they have been touched by a player. When this occurs the object receives a linked message containing the ID (identifier) of the player who joined. The link_message( ) function is called when this occurs. An example of the link_message( ) function 701 for a particular example embodiment is shown in FIG. 7.

The link_message( ) function 701 has three different jobs, which are to add players to the game, react to input from the players, and receive image information from the server 603. When the function is called, the link_message( ) function 701 checks to see how many players are currently in the game. If there are no players currently in the game, the link_message( ) function 701 adds the player ID sent to it and increments a counter called playersConnected( ). If there is one player in the game already, then the link_message( ) function 701 checks to see if the ID sent to it is the same as the other player. If it isn't then it adds that player, increments the playersConnected( ) counter and starts the game. Finally, link_message( ) 701 is also in charge of receiving input from the player objects. When the users type a keyword which the objects hear, the input is sent using the link_message( ) system. The object handles the input by checking who sent it and then sending it to the handleInput( ) function When the handleInput( ) function is called, the handleInput( ) function checks to see if the keyword is in the other player's list. If it isn't, the handleInput( ) function adds the keyword to the players list of guesses and the round continues. If it is in the other player's input, the handleInput( ) function adds the appropriate points to the users score and resets the word lists and the time it took to guess the same keyword. At this time, the handleInput( ) function also gets a new picture from the server 603 for the players to guess.

To get the picture from the server, the object uses an HTTP request. When the server 603 responds, it is handled by the http_response( ) function. This function handles all of the responses the server 603 sends back. To handle the response, the function begins by parsing the data sent back into three different parts which are separated by a '|' as a delimiter. This is accomplished by using the LSL function llParseString2List, which takes a string and a delimiter and breaks the string up into multiple strings along the delimiter. The first part contains the URL of the image; the second part contains the image identifier; the third part contains any taboo words which the users cannot use. The taboo words are also separated by a delimiter. After the parts have been separated, the URL and the taboo words are sent to the player objects 602 using the linked message system. The image ID is stored in the main object 601 to be used later.

To keep track of the time taken for the game, a timer( ) function is used. To use a timer in Second Life in a function, you use the command llSetTimerEvent(1.0) and then create a function called timer( ), which is called every one second or however many seconds you set in the llSetTimerEvent( ). In our timer( ) function, we keep track of several different times. If there is only one player connected, we keep track of how long they are connected alone. We do this to allow for a time out if no other user connects. This prohibits one player from being connected and not allowing others to join. When the game has two players, the timer keeps track of the time taken on this single picture and the time taken for the entire game session. When the time for the game session is up, the endgame( ) function is called.

When the endgame( ) function is called, this function takes care of all of the loose ends of the game. The endgame( ) function first shuts off the timer and sends any game data to the server 603 for it to store. Then, the endgame( ) function resets the player id's and the game data such as the time and points. At this time, the endgame( ) function also sends a message to the player objects 602 to alert them that the game has ended. Once this is done, the game sits and waits for another response from the player objects 602 saying a player has joined.

TaggerSL Player Objects

Since most of the gameplay functionality is housed in the main object 601, the player objects 602 are much simpler and act more as an interface between the player and the main object 601. The player object 602 of an example embodiment consists of three different functions, which are touch_start( ), listen( ) and link_message( ).

The touch_start( ) function is what is called when the player touches this object. This is how the player starts the game. When this function is called, the player's key is stored and if it is not null, then a message is sent to the main object 601. The message is handled by the link_message( ) in that object 601. The player ID is stored so that the listen( ) function knows which player to which the listen( ) function should be listening.

The listen( ) function is called when the object hears a user talking within its range. When this occurs, the ID of the player who spoke is checked against the ID of the player for which the object is listening. If the ID of the player who spoke is the correct user, the listen( ) function sends a message to the main object 601 containing information indicative of what that user said. The link_message( ) of the main object 601 then takes care of handling the input.

There are two different occasions where the main object 601 talks to the player objects 602. These occasions are all handled in the link_message( ) function of the player object 602. The first of these is during the beginning of the game. When the player object 602 sends a message with the player's ID, the main object 601 can send back one of two replies. The main object 601 can either tell the player object 602 the name has been added or that the name has been used. The link_message( ) function of the player object 602 will handle these accordingly. There is also communication at the end of the game when the main object 601 sends back a reply saying the game has ended, and the player object 602 should delete its knowledge of the game.

These basic functions in the player object 602 allow it to act as an interface between the player and the main object 601. This helps us to overcome some of the difficulties which Second Life presents when creating a game.

Server

The web server for TaggerSL underwent the majority of changes throughout the design and implementation phases. The source code could be written in Ruby on Railsor as Java Servlets to run on our server. PHP was the language of choice for our server application; PHP had all the functionality that we required and was supported by our host. But, it will be apparent to those of ordinary skill in the art that other systems can be used to implement the equivalent functionality described and claimed herein.

The core functionality that PHP possessed was that it was able to interact with a MySQL database, the design of which will be discussed later, and that PHP could read in data from an HTTP request and send a response that could be parsed within Second Life. As described above, the objects within Second Life can submit an HTTP request to our web server, specifically our PHP script. Within the URL, the in-game objects could specify what action needed to be performed by the server, such as generating a random image URL, updating tags associated with an image, or ending the game and recording the scores of the players In order to implement the necessary functions into our server-side application, we had to first start by allowing the client to input data by appending variables to the end of the URL. For example, when the game ends in Second Life, our object submits an HTTP request to the following URL: http://www.endevr.net/esp/esp.php?end&p1Name=X&p2Name=Y&score=Z These variables let our system know that the game has ended and that players X and Y have scored a total of Z points. To obtain this information from the URL, the PHP on the server uses the $_GET associative array. The example code segment illustrated in FIG. 8 shows a simple check on what the game state is and then puts the variables from the "$_GET" array into easier to use local variables.

After utilizing $_GET to check the state of our game, we can then interact with our database 605 regardless of the state. Before any queries can be made, the PHP script can first connect to a MySQL server. This connection is made by utilizing the mysql_connect($server, $username, $password) function, where $server refers to the server address (in our case, "localhost" can be used) and $username and $password refer to your login credentials for this server. Once connected to the server, the script then accesses the necessary database $dbname by calling mysql_select_db ($dbname).

Now that a database 605 has been selected within the MySQL server, specific queries can be made depending on the game state. If a game has started, the database 605 is queried for its size and then a random entry is chosen. The URL from that entry in the database 605 is then returned along with its ID number and passed to our client in Second Life to be parsed. If the players match a tag in-game, a request is made to update the tag information on a specific ID number and adding to the weight of the tag. The weight of the tag refers to the number of times that specific tag has been used to describe the image and gives that image priority in searches. Once the tag has been updated, a new image URL and ID number are sent to our Second Life client, as well as a list of taboo keywords for that image. This process is repeated every time that the players successfully match tags and score points until time runs out. Once time runs out, the client submits the player names and total score to be added to their lifetime totals.

Database

One reason for creating the TaggerSL game is to utilize human computation. To do this, we needed to keep track of the data which was processed during the game. We accomplished this by creating a database which would keep track of the results of the game as well as the end score. Once all of the data from the game was stored, people could then look at the collection and pull some greater meaning from it.

The database we chose was an SQL database. Using this database, we created three different tables in the database. The tables were players, images, and keywords. A model of our database design in an example embodiment is illustrated in FIG. 9. FIGS. 10-12 illustrate the tables of our database design in an example embodiment.

The player table 1000, shown in FIG. 10, stores the information about the users who play the game. Since each Second Life user has a unique name, we use this as our primary key for this table. We also store the user's overall score and the number of games they have played. After the conclusion of each game, the user's data is sent to the server. If the player does not have a record in our database, a new record for them is created, their score is stored, and the number of games played is set to 1. Otherwise, their score is added to the previous score and the number of played games is increased accordingly.

The image table, shown in FIG. 11, keeps track of the information about the images used for gameplay. The table consists of a field for the URL of the image, a unique ID which is the primary key of the table, and a timestamp of the last time the image was tagged. We use the timestamp to find the most recently tagged image and to see if certain images are not being displayed or tagged. The images are loaded into the table prior to the game and the server selects a random image from the table to display for the game.

Finally, the keywords table, shown in FIG. 12, is used to record the keywords which are associated with the images. They consist of the ID of the image, a string which is the keyword, and a weight which is the number of times this image has been tagged with this word. A purpose of the weight is to see which words are the most tagged for the image and to figure out which words to restrict the use of to force the players to come up with more interesting keywords.

Search

The functionality of our server is expanded upon by adding a front page, which provides a means to search of our database. By allowing users to search the database, they are able to witness the utility of TaggerSL firsthand as it creates a robust image search over time. The search allows a user to input a text string that will be compared to all the image tags in the database. If a tag is a match, that image will be displayed as a thumbnail providing a link to the full-sized image and a list of the top five tags associated with that image. If a user clicks on one of the tags associated with the image, the user can be brought to a merchant/advertiser/auction site providing products or services related to that tag. Search results are sorted according to the weight of the matching tag, which is the number of times that an image has been tagged by players using a specific keyword. FIG. 13 illustrates the search results page for a search query of the text string, "hat."

Results & Analysis

Upon completion of the implementation phase of the project, TaggerSL was a fully functional game accessible to all Second Life residents. By combining the Second Life implementation with a web page for viewing statistics and searching images within the database, the power of human computation can be seen to an extent.

Gameplay

TaggerSL's gameplay is an accurate representation of games (e.g., ESP Game and Google Image Labeler) within a virtual world (e.g., Second Life). In order to achieve this, the basic gameplay of those games had to be broken down into milestones that could easily be met and expanded upon later. Once essential features like displaying the image within Second Life and recording the players' input were completed, we refined TaggerSL by adding features that would make the game produce a richer set of tags. Restricting players from submitting frequently used, or "taboo," words was added to provide a challenge in tagging images with a very obvious keyword, as well as improve accuracy in search results.

To experience the game, users can step into a booth within Second Life located a certain distance away from their partner's booth so that they can't hear one another. Instructions on how to play the game are displayed on the game until the user interacts with it and the game begins. For two minutes, the two players will be displayed an image which they must match keywords on before being displayed a new image. The faster the players are able to match keywords, the more points they will score There are some issues which can affect the user's experience during gameplay. Network latency can have a detrimental effect upon the user experience. Connecting to the server directly shows a negligible amount of latency; but since the players are connecting through their Second Life client, calls to the server are made through a proxy from the Second Life servers. This results in a noticeable delay in most cases when loading images. One potential solution to remove the latency is to preload the next image (but this is not possible within Linden Scripting Language).

Backend

By using a combination of PHP and MySQL, our server was able to successfully handle all the requirements we set for it. The server was able to process variables from the URL using $_GET, return image URLs, IDs, and taboo words to the Second Life objects, and update the database with player and image information. While these are simply core functions of TaggerSL, we feel that the system that has been created provides a base that can be easily expanded upon to add to the experience of the game.

One way to improve the game is to increase the set of images that the database contains. The ideal image set to pull images from would be the Internet as a whole; but in order to test our system we chose to hand pick images that provided different challenges in describing them. We also selected groups of images that were similar to one another to show larger results for common search terms.

In order to utilize the whole Internet as a source for images to be used in TaggerSL, a way of selecting images from a random web page may be devised and the URL added to our database. Currently, our database of images is a listing of URLs located on our server; but these URLs could point to any server and still work in-game properly. Next, the game would have to prefer images already in the database before pulling another random image off the Internet. If the game were to pull a new image from the Internet every time, the database of image tags and keywords would not build fast enough to create a useful search engine.

Another source of images may be eBay itself. While providing a large number of images that could benefit from TaggerSL's tagging capabilities, images on eBay generally have a short lifespan. Using images from auction listings on eBay would certainly be the most the desirable source and a way to remedy the fact that images have a short lifespan would be through image comparison. When searching the database for tagged images pulled from eBay auctions, links to ongoing auctions could be provided by using image comparison software on the tagged images. This method would provide the user with images similar to those previously tagged.

Abuse

The easiest ways for our players to abuse the game would be cheating by working with other players. This could be accomplished in a number of ways. One way a user could cheat would be to have the person they are playing with be physically next to them. This way they could tell the other player what they were putting down. Similarly, players could use the shout command in Second Life or private message the other player saying what they are putting as a keyword. In any of these situations the players would take away the secrecy which drives the gameplay.

A solution to the above identified problem includes having players randomly assigned to other players, so that they would not know who to talk to in order to cheat. However, the fact that only one picture can be displayed restricted us to only having one game instance on a property. If there was only one game instance, the player would obviously know who to talk to since they would be the only other person playing. Another solution would be to have the player objects on different properties and talk using a common server. We decided, however, that the latency of Second Life would make this very time consuming and the game would be very slow Another form of abuse which could be prevalent in the game is users using inappropriate language or wrongly tagging images. One thing which we don't want as a result of our project is our images being tagged as profanity or the wrong keywords. Second Life is mostly anonymous, and when people are able to talk anonymously, the worst in them can come out. To remedy this situation, a list of inappropriate words and scanning the input for profanity may be created.

Limitations

A first limitation we met with Second Life was that users can hear other users if they are within 20 meters of each other. Additionally, there is no way to silence a player to work around this. An aspect to the gameplay required the users to not be able to see the other player's guesses. When this problem occurred, we needed to adapt. To add to this problem, if the user shouts they can be heard anywhere within 100 meters. One solution included requiring the user to submit their input using a different chat channel. This, however, would not restrict them from talking on the main channel as well and telling the other user what they sent to the game. Another solution is to require the users to be far enough away that they could not hear each other; but the game objects themselves could still talk to each other.

Once we developed a solution to this problem, we encountered another problem in Second Life: Objects in the game can only be 10 meters wide or tall. Our solution to the previous problem required us to have the players far from each other so they could not hear each other. We were restricted how large we could make a single object, so we needed to make several objects which would be linked together to talk to each other. Unfortunately, you can only link objects within a certain distance of each other. It is not really stated how far this link can be, so we needed to guess and check until we found the maximum distance. The distance is around 20 meters which was far enough that if the users stood near the object, the object could hear them but the other person could not. This made our final design much different. We now had two separate rooms far from each other where the users would be.

Example Mini-Games

While the eBay Store we created in Second Life allows players to browse categories for items on eBay in a virtual world, it is limited by the number of objects on display in the store. In an effort to provide new and fun ways of searching and browsing eBay listings, our team developed a series of mini-games in Adobe Flash CS3.

Methodology

We developed the example mini-games by executing a series of small Waterfall-type development cycles, one for each game. These cycles overlapped, and each involved a similar process of planning, prototyping, iteration, and polishing.

Prototype

Our first step in developing each game was to create a small prototype that captured a core gameplay element. We intended these prototypes to be easily accessible to all members of the team, such that we could develop them further while still maintaining a viewable product. Many of our prototyping efforts built off from one another, resulting in some unified code between games (e.g., we first implemented the menu system in State Fair, carried it over to Ice Fishing, added to it on that project, and then returned it to State Fair).

Design of Example Embodiments

State Fair

We designed the State Fair mini-game to be both easy to implement and play. Players press two buttons, alternating left and right to advance their frog. Rapidly alternating presses advances a player's frog more quickly, with the winner designated as the player whose frog reaches the finish line first. While a row of human players participated in the game with large buttons in the advertisement, we planned to simulate all but one of the players with simple artificial intelligence. Later in the development of State Fair, we designed a simple main menu screen and a victory trophy case. We envisioned the menu as having the eBay logo, the title of the game, and buttons for Play Game, Options, and Help. FIG. 14 illustrates an example of the State Fair menu screen. We sketched the trophy case as an organized means to display popular eBay items.

Ice Fishing

Ice Fishing is another example of a three-dimensional mini-game. A player controls a fishing-line that can hook various items in a 3D virtual space. The hookable items can correspond to winnable items on eBay, for example. We aimed to take advantage of some two-dimensional physics, such as buoyancy and collisions, to create a challenging gameplay experience. Later, we decided to take advantage of the menu system that had been designed for State Fair. We thought of other features like timers and a score system to enhance the game play. Soon after, we devised different methods of linking the game more directly to eBay through the use of the eBay API, including popular or search-based items to catch in the sea.

Hail Mary

The Hail Mary game is another example of a three-dimensional mini-game. The game involves an item being thrown like a football in a 3D virtual space, with a group of individuals each trying to catch it. Our game play can put the player in the role of one of these receivers, attempting to predict the flight path of a thrown item, and outmaneuvering other receivers in an attempt to win the item. A shadow's position and scale would indicate the position and height of the item, and players would have the options to push other players to clear the area where they predicted the item would land.

Dog Race

Our idea for Dog Race was very similar to State Fair: players would strive to be the first to cross a finish line by rapidly pressing some combination of keys.

Fox Hunt

In the Fox Hunt game, participants hunt an item with hounds, but would not compete against each other. Instead, the challenge in the game play would emerge from a delay in the execution of the player's instructions to the hounds under his or her control. These hounds behave as a pack (with flocking characteristics), and loosely follow the player's mouse; so, while the player can clearly make out the location of the prize item, the apparatus he or she must use to collect it—combined with the evasive movements of the item itself—create a challenging (but not enthusiasm-crushing) experience.

Implementation of Example Embodiments

State Fair

We developed our first prototype of State Fair with frogs represented as large blue squares. The player-controlled frog would move to the right each time the player alternated left and right arrow key presses on the keyboard. We also created artificial intelligence (AI)-controlled frogs to provide competition, each of which had a random chance to make the correct press every 70 ms. When the frogs reached the finish line, a win event was dispatched that the game handled appropriately. While we tweaked and expanded the graphics and animation extensively, this core implementation remained relatively intact throughout the remainder of the game's development.

Visual Refinement

To achieve real playability and more accurately parallel its corresponding advertisement, we created a series of artistic assets and effects for State Fair. The avatars controlled by players in the game (both human and AI) are colored frogs. We developed our frog sprites using screenshots from an advertisement as a reference. We also created waves and a checkerboard finish line to populate the background for the game's action. We animated each wave to move back and forth at a random speed, and each frog to follow a hopping animation (initially done with the Tween class in ActionScript 3, but later replaced by the TweenLite animation engine).

Menus and Dialog

Next, we added a main menu to introduce and launch the game, and provide help for new players. We also created a countdown animation that runs when the game starts, and win/loss screens to bring closure to the game. Finally, we created a trophy case and trophy holder objects to display images of real eBay items, connecting the game to the website.

Integrating the eBay API

Each of our flash mini-games makes use of the eBay Shopping API to retrieve and display real items being sold on eBay. State Fair places an item image just beyond the finish line in front of each frog, and then displays these items in a trophy case upon completion of the game (when a frog crosses the finish line). Players may click on the items shown in State Fair at any time to open an Internet browser that automatically navigates to the item's webpage.

Finalizing and Polish

The final element we included in State Fair was a text entry field accessible at the main menu that permits players to enter a search term, impacting the items that are displayed in the game. We also added a link to the virtual store (eBay Island) in Second Life.

Ice Fishing

Our development of Ice Fishing became the focus of the mini-games project as it became apparent that it could serve as an effective alternative method to browse the eBay site.

Prototype

The first task we set out to complete in Ice Fishing was to incorporate a 2D physics engine so that we could create believable game play. We decided to use the Box2DFlashAS3 library, a port of the C++ Box2D 2D Physics Engine to Flash, but implemented our own controls for handling object densities and buoyant force. The underwater volume of partially submerged bodies was approximated by using the intersection between the bounding boxes of the body and the water region. While not perfect for irregularly shaped items, this approach gave believable results. The first playable version of the game had a rope, guided by mouse movements, with a magnet attached that attracted various shapes that floated or sank based on a randomly assigned density. This rope was modeled as a series of thin boxes connected with revolute joints. Initial experiments with the rope used spheres connected by distance joints, but this proved too unstable.

Further refinement early on in the game's development remapped the control scheme to the keyboard, and fixed a variety of smoothing problems with the animation of the fishing line. Ice Fishing was also the first of our games to use a timer to limit time spent per round of game play, and a score system that provided players with an evaluation of their performance. Finally, we introduced a number of small fish with steering and flocking behaviors that collide with objects in the water, providing an element of randomness to the game.

Visual Refinement and Game Modes

We did not make use of the eBay API in the Ice Fishing game until we had finished incorporating it into State Fair. Earlier builds of the Ice Fishing game used pre-made generic objects instead of images from eBay; this allowed us to implement more accurate collision detection for these objects by aligning transparent primitives to the general outline of the objects. We grouped these primitives into a collision symbol for each object which we then placed as a named instance in the objects themselves, allowing our scripts to refer to the collision areas of each object. This mode of the game can still be played if a player omits a search term at the main menu (which we copied from State Fair) and clicks the "Play" button. The other, search-enabled game mode does use the API, as described below.

Integrating the API

Having used the eBay Shopping API in State Fair to retrieve images of real items found for sale on eBay, we made use of it again to replace our default pre-made objects in Ice Fishing with items from eBay. We extended our work from State Fair by transforming the trophy case into a trophy factory that could create between one and fifty trophy objects, each of which contained an eBay item. We also decoupled the factory from the game, making it very portable—so much so that we used it directly in Fox Hunt later on.

We also made use of many of the data made available by the eBay API; we incorporated information about an item's current price, feedback on its seller, and the duration of time remaining on its auction into the behavior of items as they appeared in the game. The heuristic values resulting from the combination of these characteristics determine the density of each item, causing some to float and others to sink. Next, we created sliders to allow players to assign weights to each of the item characteristics we included.

Final Touches

Most of our remaining development on Ice Fishing involved revising various areas of the code for portability to the other games. For example, we created a pop-up dialog that listed various characteristics of any given item when the mouse cursor is hovered over that item, and then moved that action's script to a common directory that allows it to be used with all the games. We undertook a similar process for the physics library, steering behavior library, TweenLite engine and trophy case layout manager from State Fair, menu behavior, results screens, and the trophy (item) factory.

Fox Hunt

Our first efforts directed towards Fox Hunt resulted in a much larger set of steering behaviors, originally based off those used by the fish in Ice Fishing. We established many of the primary game play features for this game in the prototype, including flocking and separation behavior for the hounds (objects that follow the player's mouse cursor around the screen), and basic wander and flee behavior for the foxes (placeholders for items retrieved through the eBay API).

Visual Refinement, Menus, and API Usage

In addition to creating hound sprites that more closely resembled hounds (initially they were nearly indistinguishable from the circular fox objects), we created various visual elements that created new game play aspects. These included bushes—which partially occlude foxes, and also serve as waypoints for them to move between (as opposed to random wandering)—and a trap object that captures foxes when a player chases them into it. We altered the foxes too, so that they displayed items retrieved from eBay, and moved faster or slower based on characteristics of the items (much like we set the density values in Ice Fishing).

Again, we inserted a main menu as a launcher for the game, and it included dialogs for help text for new players, and a settings panel to allow players to adjust the weights of the characteristics used to determine fox speeds. The game also included a scoring system and timer similar to Ice Fishing, and the search bar first created in State Fair.

Shared Codebase

As the games were being developed, we established a sizeable shared codebase, which we stored in a common directory. The first instance of this was the set of steering behaviors that we initially wrote for the fish in Ice Fishing, which we then reused and expanded for the foxes and hounds in Fox Hunt. The common codebase grew as code was re-factored to use the same base code for menus, game state management, and communication with the eBay API. This common code has been extremely valuable, and has reduced the cost of developing additional games.

Results and Analysis

The final products of our example Mini-Game project include three mini-games, a common library of classes used to create them, and documentation describing how our system works. More importantly, our games represent a new way to browse the eBay website, and a platform for future development.

Games as an Alternative Search

As most clearly demonstrated in Ice Fishing, our mini-games can serve as an alternative method of browsing product or service (e.g. eBay) listings provided on a merchant, advertiser, or aggregator site. We provide players with the opportunity to specify what characteristics of an item or auction they are most interested in, and interactively display the results of their searches. Ice Fishing and Fox Hunt feature a settings dialog where players can enter weights of various characteristics of the items shown in the games. These weights determine the behavior of the items; for instance, in Ice Fishing the density of a given item is modified based on the user-specified weights. The weights correspond to characteristics of an item on eBay, such as its current price, seller feedback rating, or time left on its auction. Any property of an item returned by the Shopping API can be used to affect this weight, provided a function exists to transform the values to a numeric value. Our team defined the characteristics used by these functions in a common Heuristics class, and they are passed to a function in the TrophyFactory that scales and combines their values according to the user-specified weights.

In addition, our games are intended to make searching eBay more enjoyable and fun for buyers. We allow players to 'catch' the items, creating an environment that promotes a new type of buyer interest in eBay listings. Our games are also based on the Shop Victoriously advertisements; people, through our mini-games, can participate in an interactive version of advertisements they have seen. In this way, our mini-games provide a bridge between the advertisements and the eBay site.

Additional Features

Special promotions may be incorporated in the games, providing players with much more incentive to play them; players could be given special recognition on eBay, perhaps through various achievements or awards displayed in their user profiles on the website. More tangible rewards could be offered as well, such as giveaways and prizes for high-scoring players.

First example embodiments of the games make use of the publicly available eBay Shopping API. However further embodiment may make use of their private, internal API calls to enhance the games. For example, the current maximum number of search results returned by a single request made through the Shopping API is fifty, which currently limits our games to displaying that many items or less; by using internal calls, the number of items to display would not be constrained by this limit.

CONCLUSION

Our team explored new methods of presenting and interacting with data from eBay. We used Second Life as a medium to allow users to browse various categories of eBay in a manner much more akin to going to a real store. In addition to creating another venue for people to connect to eBay, our virtual store is an environment for displaying and advertising items users may not have known they wanted when they walked into the store. Our example embodiment of the virtual store can be easily extended to represent many more categories of products or services as needed.

Our virtual property in Second Life also hosts our TaggerSL image tagging game. This game encourages players to generate useful data—in this case, tags for an assortment of images. This game can also be used by players to generate user-created tags for an assortment of product, service, or business listings. Currently, the game uses images from a static database; however, it is feasible that future developers could retrieve images directly from eBay listings, essentially creating a system in which buyers and sellers can improve eBay Search.

Finally, banners found in the virtual store link to a series of Flash-based mini-games we created. We based these games on the example advertisement series, and built them on top of the eBay Shopping API. In this way, the mini-games provide yet another means to browse and access listings on any merchant, advertiser, or aggregator site (e.g. eBay), with the bonus of being associated with a merchant, advertiser, or aggregator marketing campaign. Our team created a common code-base for these games, allowing future developers to easily and quickly generate new games as needed.

FIG. 15 is a network diagram depicting a client-server system 2100, within which one example embodiment may be deployed. A networked system 2100, in the example forms of a network-based marketplace or publication system, provides server-side functionality, via a network 2104 (e.g., the Internet or Wide Area Network (WAN)) to one or more clients. FIG. 15 illustrates, for example, a web client 2106 (e.g., a browser, such as the Internet Explorer browser developed by Microsoft Corporation of Redmond, Wash. State), and a programmatic client 2108 executing on respective client machines 2110 and 2112.

An Application Program Interface (API) server 2114 and a web server 2116 are coupled to, and provide programmatic and web interfaces respectively to, one or more application servers 2118. The application servers 2118 host one or more marketplace applications 2110 and payment applications 2112. The application servers 2118 are, in turn, shown to be coupled to one or more databases servers 2114 that facilitate access to one or more databases 21216.

The marketplace applications 2110 may provide a number of marketplace functions and services to users that access the networked system 2100. The payment applications 2112 may likewise provide a number of payment services and functions to users. The payment applications 2112 may allow users to accumulate value (e.g., in a commercial currency, such as the U.S. dollar, or a proprietary currency, such as "points") in accounts, and then later to redeem the accumulated value for products (e.g., goods or services) that are made available via the marketplace applications 2110. While the marketplace and payment applications 2110 and 2112 are shown in FIG. 15 to both form part of the networked system 2100 it will be appreciated that, in alternative embodiments, the payment applications 212121 may form part of a payment service that is separate and distinct from the networked system 21021.

Further, while the system 2100 shown in FIG. 15 employs a client-server architecture, the present invention is of course not limited to such an architecture, and may equally well find application in a distributed, or peer-to-peer, architecture system, for example. The various marketplace and payment applications 2110 and 2112 may also be implemented as standalone software programs, which do not necessarily have networking capabilities.

The web client 2106 accesses the various marketplace and payment applications 2110 and 2112 via the web interface supported by the web server 2116. Similarly, the programmatic client 2108 accesses the various services and functions provided by the marketplace and payment applications via the programmatic interface provided by the API server 2114. The programmatic client 2108 may, for example, be a seller application (e.g., the TurboLister application developed by eBay Inc., of San Jose, Calif.) to enable sellers to author and manage listings on the networked system 2100 in an off-line manner, and to perform batch-mode communications between the programmatic client 2108 and the networked system 2100.

FIG. 15 also illustrates a third party application 2118, executing on a third party server machine 2130, as having programmatic access to the networked system via the programmatic interface provided by the API server. For example, the third party application may, utilizing information retrieved from the networked system, support one or more features or functions on a website hosted by the third party. The third party website may, for example, provide one or more promotional, marketplace or payment functions that are supported by the relevant applications of the networked system.

Figure 16:
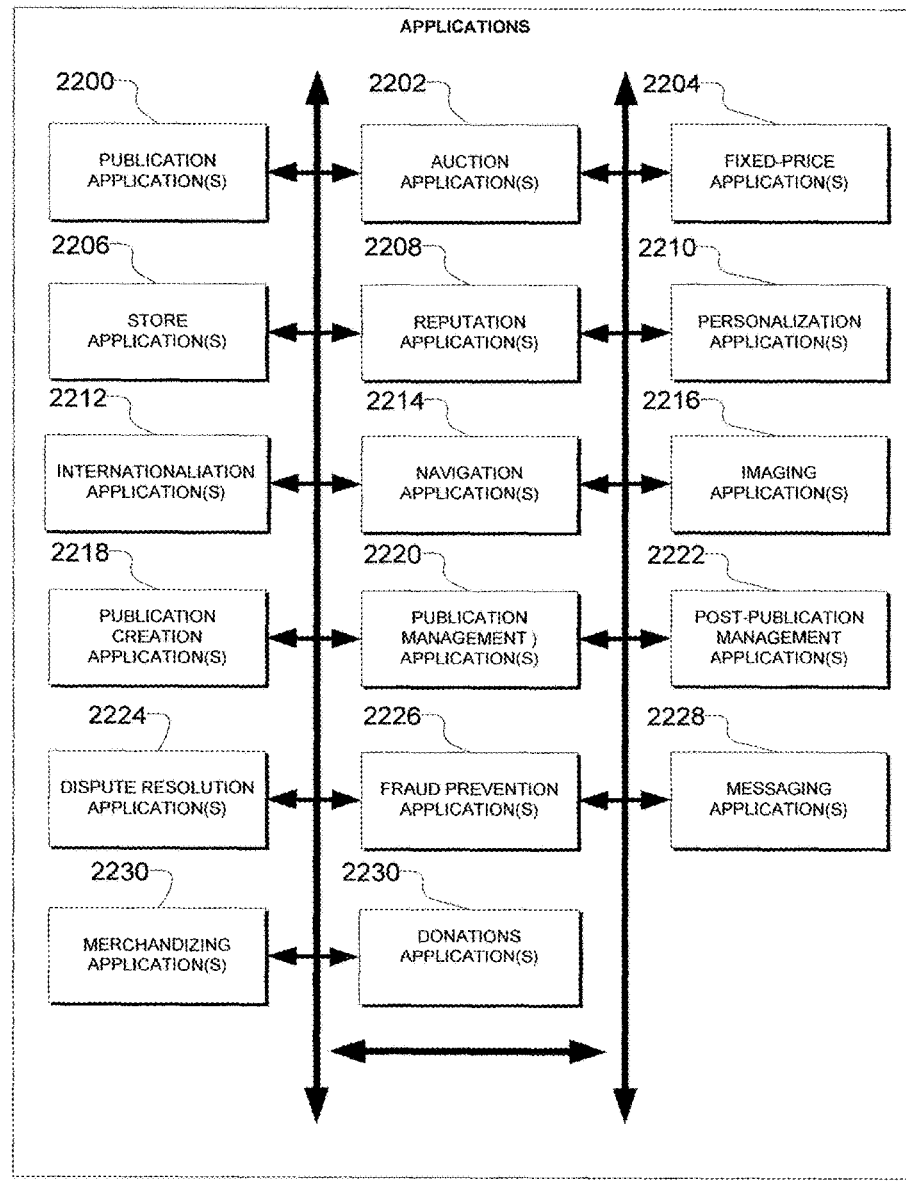
FIG. 16 is a block diagram illustrating multiple applications and that, in one example embodiment, are provided as part of the networked system.

FIG. 16 is a block diagram illustrating multiple applications and that, in one example embodiment, are provided as part of the networked system. The applications may be hosted on dedicated or shared server machines (not shown) that are communicatively coupled to enable communications between server machines. The applications themselves are communicatively coupled (e.g., via appropriate interfaces) to each other and to various data sources, so as to allow information to be passed between the applications or so as to allow the applications to share and access common data. The applications may furthermore access server one or more databases via the database servers.

The networked system may provide a number of publishing, listing and price-setting mechanisms whereby a seller may list (or publish information concerning) goods or services for sale, a buyer can express interest in or indicate a desire to purchase such goods or services, and a price can be set for a transaction pertaining to the goods or services. To this end, the marketplace applications are shown to include at least one publication application 2200 and one or more auction applications 2202 which support auction-format listing and price setting mechanisms (e.g., English, Dutch, Vickrey, Chinese, Double, Reverse auctions etc.). The various auction applications 2202 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 2204 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with auction-format listings, and allow a buyer to purchase goods or services, which are also being offered for sale via an auction, for a fixed-price that is typically higher than the starting price of the auction.

Store applications 2206 allow a seller to group listings within a "virtual" store, which may be branded and otherwise personalized by and for the seller. Such a virtual store may also offer promotions, incentives and features that are specific and personalized to a relevant seller.

Reputation applications 2208 allow users that transact, utilizing the networked system, to establish, build and maintain reputations, which may be made available and published to potential trading partners. Consider that where, for example, the networked system supports person-to-person trading, users may otherwise have no history or other reference information whereby the trustworthiness and credibility of potential trading partners may be assessed. The reputation applications 2208 allow a user, for example through feedback provided by other transaction partners, to establish a reputation within the networked system 21021 over time. Other potential trading partners may then reference such a reputation for the purposes of assessing credibility and trustworthiness.

Personalization applications 2210 allow users of the networked system to personalize various aspects of their interactions with the networked system. For example a user may, utilizing an appropriate personalization application 2210, create a personalized reference page at which information regarding transactions to which the user is (or has been) a party may be viewed. Further, a personalization application 2210 may enable a user to personalize listings and other aspects of their interactions with the networked system and other parties.

The networked system may support a number of marketplaces that are customized, for example, for specific geographic regions. A version of the networked system may be customized for the United Kingdom, whereas another version of the networked system may be customized for the United States. Each of these versions may operate as an independent marketplace, or may be customized (or internationalized) presentations of a common underlying marketplace. The networked system may accordingly include a number of internationalization applications 2212 that customize information (and/or the presentation of information) by the networked system according to predetermined criteria (e.g., geographic, demographic or marketplace criteria). For example, the internationalization applications 2212 may be used to support the customization of information for a number of regional websites that are operated by the networked system and that are accessible via respective web servers.

Navigation of the networked system may be facilitated by one or more navigation applications 2214. For example, a search application (as an example of a navigation application) may enable key word searches of listings published via the networked system. A browse application may allow users to browse various category, catalogue, or inventory data structures according to which listings may be classified within the networked system. Various other navigation applications may be provided to supplement the search and browsing applications.

In order to make listings, available via the networked system, as visually informing and attractive as possible, the marketplace applications may include one or more imaging applications 2216 utilizing which users may upload images for inclusion within listings. An imaging application 2216 also operates to incorporate images within viewed listings. The imaging applications 2216 may also support one or more promotional features, such as image galleries that are presented to potential buyers. For example, sellers may pay an additional fee to have an image included within a gallery of images for promoted items.

Listing creation applications 2218 allow sellers conveniently to author listings pertaining to goods or services that they wish to transact via the networked system, and listing management applications 2220 allow sellers to manage such listings. Specifically, where a particular seller has authored and/or published a large number of listings, the management of such listings may present a challenge. The listing management applications 2220 provide a number of features (e.g., auto-relisting, inventory level monitors, etc.) to assist the seller in managing such listings. One or more post-listing management applications 2222 also assist sellers with a number of activities that typically occur post-listing. For example, upon completion of an auction facilitated by one or more auction applications 2202, a seller may wish to leave feedback regarding a particular buyer. To this end, a post-listing management application 2222 may provide an interface to one or more reputation applications 2208, so as to allow the seller conveniently to provide feedback regarding multiple buyers to the reputation applications 2208.

Dispute resolution applications 2224 provide mechanisms whereby disputes arising between transacting parties may be resolved. For example, the dispute resolution applications 2224 may provide guided procedures whereby the parties are guided through a number of steps in an attempt to settle a dispute. In the event that the dispute cannot be settled via the guided procedures, the dispute may be escalated to a third party mediator or arbitrator.

A number of fraud prevention applications 2226 implement fraud detection and prevention mechanisms to reduce the occurrence of fraud.

Messaging applications 2228 are responsible for the generation and delivery of messages to users of the networked system, such messages for example advising users regarding the status of listings at the networked system (e.g., providing "outbid" notices to bidders during an auction process or to provide promotional and merchandising information to users). Respective messaging applications 2228 may utilize any one have a number of message delivery networks and platforms to deliver messages to users. For example, messaging applications 2228 may deliver electronic mail (e-mail), instant message (IM), Short Message Service (SMS), text, facsimile, or voice (e.g., Voice over IP (VoIP)) messages via the wired (e.g., the Internet), Plain Old Telephone Service (POTS), or wireless (e.g., mobile, cellular, WiFi, WiMAX) networks.

Merchandising applications 22220 support various merchandising functions that are made available to sellers to enable sellers to increase sales via the networked system. The merchandising applications 22220 also operate the various merchandising features that may be invoked by sellers, and may monitor and track the success of merchandising strategies employed by sellers.

The networked system itself, or one or more parties that transact via the networked system, may operate loyalty programs that are supported by one or more loyalty/promotions applications. For example, a buyer may earn loyalty or promotions points for each transaction established and/or concluded with a particular seller, and be offered a reward for which accumulated loyalty points can be redeemed.

Various tables that may be maintained within the databases, and that are utilized by and support the applications. A user table contains a record for each registered user of the networked system, and may include identifier, address and financial instrument information pertaining to each such registered user. A user may operate as a seller, a buyer, or both, within the networked system. In one example embodiment, a buyer may be a user that has accumulated value (e.g., commercial or proprietary currency), and is accordingly able to exchange the accumulated value for items that are offered for sale by the networked system.

The tables also include an items table in which are maintained item records for goods and services that are available to be, or have been, transacted via the networked system. Each item record within the items table may furthermore be linked to one or more user records within the user table, so as to associate a seller and one or more actual or potential buyers with each item record.

A transaction table contains a record for each transaction (e.g., a purchase or sale transaction) pertaining to items for which records exist within the items table.

An order table is populated with order records, each order record being associated with an order. Each order, in turn, may be with respect to one or more transactions for which records exist within the transaction table.

Bid records within a bids table each relate to a bid received at the networked system in connection with an auction-format listing supported by an auction application 2202. A feedback table is utilized by one or more reputation applications 2208, in one example embodiment, to construct and maintain reputation information concerning users. A history table maintains a history of transactions to which a user has been a party. One or more attributes tables record attribute information pertaining to items for which records exist within the items table. Considering only a single example of such an attribute, the attributes tables may indicate a currency attribute associated with a particular item, the currency attribute identifying the currency of a price for the relevant item as specified in by a seller.

Modules, Components and Logic

Certain embodiments are described herein as including logic or a number of components, modules, or mechanisms. A component is tangible unit capable of performing certain operations and may be configured or arranged in a certain manner. In example embodiments, one or more computer systems (e.g., a standalone, client or server computer system) or one or more components of a computer system (e.g., a processor or a group of processors) may be configured by software (e.g., an application or application portion) as a component that operates to perform certain operations as described herein.

In various embodiments, a component may be implemented mechanically or electronically. For example, a component may comprise dedicated circuitry or logic that is permanently configured (e.g., as a special-purpose processor) to perform certain operations. A component may also comprise programmable logic or circuitry (e.g., as encompassed within a general-purpose processor or other programmable processor) that is temporarily configured by software to perform certain operations. It will be appreciated that the decision to implement a component mechanically, in dedicated and permanently configured circuitry, or in temporarily configured circuitry (e.g., configured by software) may be driven by cost and time considerations.

Accordingly, the term "component" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which components are temporarily configured (e.g., programmed), each of the components need not be configured or instantiated at any one instance in time. For example, where the components comprise a general-purpose processor configured using software, the general-purpose processor may be configured as respective different components at different times. Software may accordingly configure a processor, for example, to constitute a particular component at one instance of time and to constitute a different component at a different instance of time.

Components can provide information to, and receive information from, other components. Accordingly, the described components may be regarded as being communicatively coupled. Where multiple of such components exist contemporaneously, communications may be achieved through signal transmission (e.g., over appropriate circuits and buses) that connect the components. In embodiments in which multiple components are configured or instantiated at different times, communications between such components may be achieved, for example, through the storage and retrieval of information in memory structures to which the multiple components have access. For example, one component may perform an operation, and store the output of that operation in a memory device to which it is communicatively coupled. A further component may then, at a later time, access the memory device to retrieve and process the stored output. Components may also initiate communications with input or output devices, and can operate on a resource (e.g., a collection of information).

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., an FPGA (field programmable gate array) or an ASIC (application-specific integrated circuit).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination permanently and temporarily configured hardware may be a design choice. Below are set out hardware (e.g., machine) and software architectures that may be deployed, in various example embodiments.

Example Machine Architecture and Machine-Readable Medium

Figure 17:
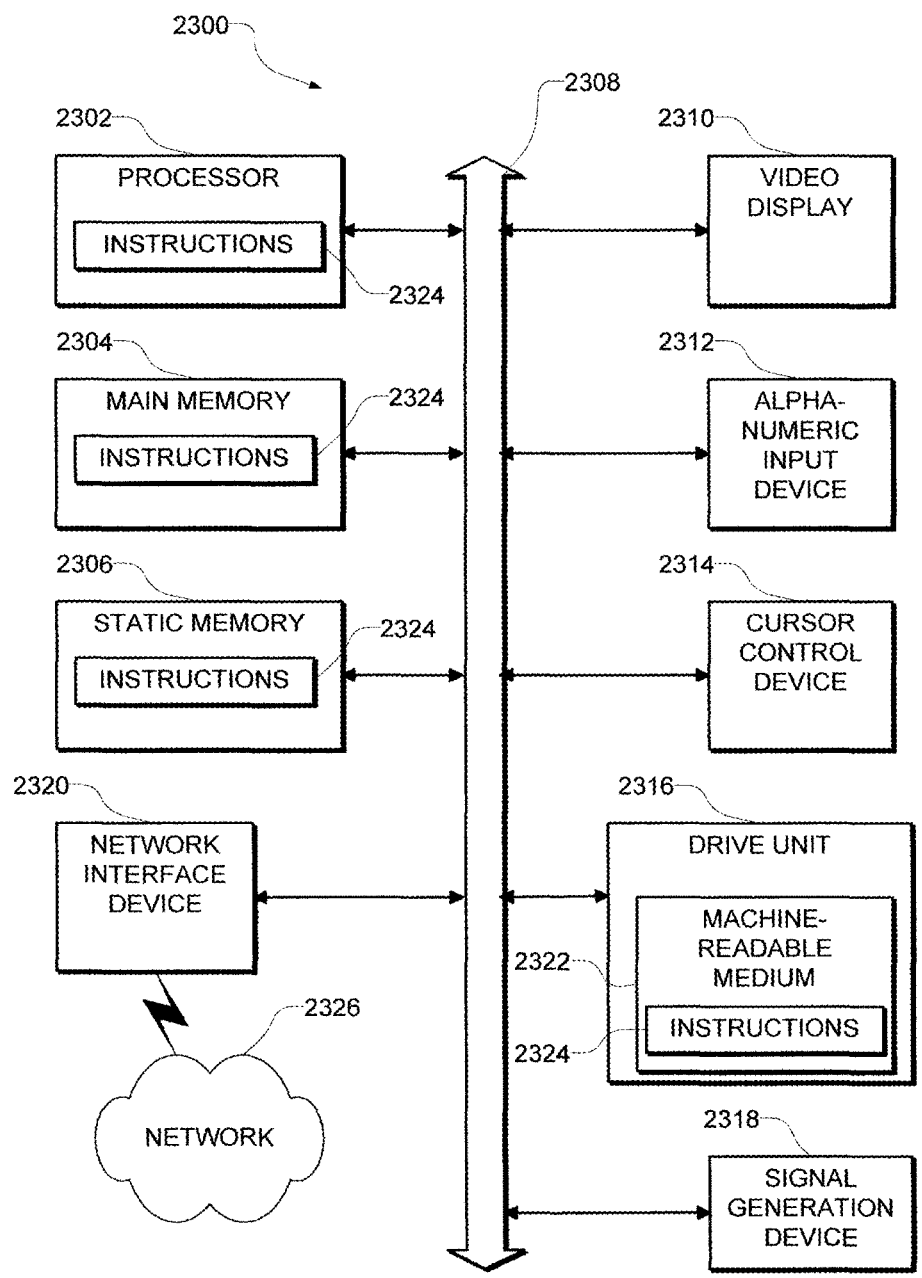
FIG. 17 is a block diagram of machine in the example form of a computer system 2300 within which instructions, for causing the machine to perform any one or more of the methodologies discussed herein, may be executed.

FIG. 17 is a block diagram of machine in the example form of a computer system 2300 within which instructions, for causing the machine to perform any one or more of the methodologies discussed herein, may be executed.

In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 2300 includes a processor 2302 (e.g., a central processing unit (CPU), a graphics processing unit (GPU) or both), a main memory 2304 and a static memory 2306, which communicate with each other via a bus 2308. The computer system 2300 may further include a video display unit 2310 (e.g., a liquid crystal display (LCD) or a cathode ray tube (CRT)). The computer system 2300 also includes an alphanumeric input device 2312 (e.g., a keyboard), a user interface (UI) navigation device 233 (e.g., a mouse), a disk drive unit 2316, a signal generation device 2318 (e.g., a speaker) and a network interface device 2320.

Machine-Readable Medium

The disk drive unit 2316 includes a machine-readable medium 2322 on which is stored one or more sets of instructions and data structures (e.g., software 2324) embodying or utilized by any one or more of the methodologies or functions described herein. The software 2324 may also reside, completely or at least partially, within the main memory 2304 and/or within the processor 2302 during execution thereof by the computer system 2300, the main memory 2304 and the processor 2302 also constituting machine-readable media.

While the machine-readable medium 2322 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks.

Transmission Medium

The software 2324 may further be transmitted or received over a communications network 2326 using a transmission medium. The software 2324 may be transmitted using the network interface device 2320 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible medium to facilitate communication of such software.

Example Process Flow

Figure 18:
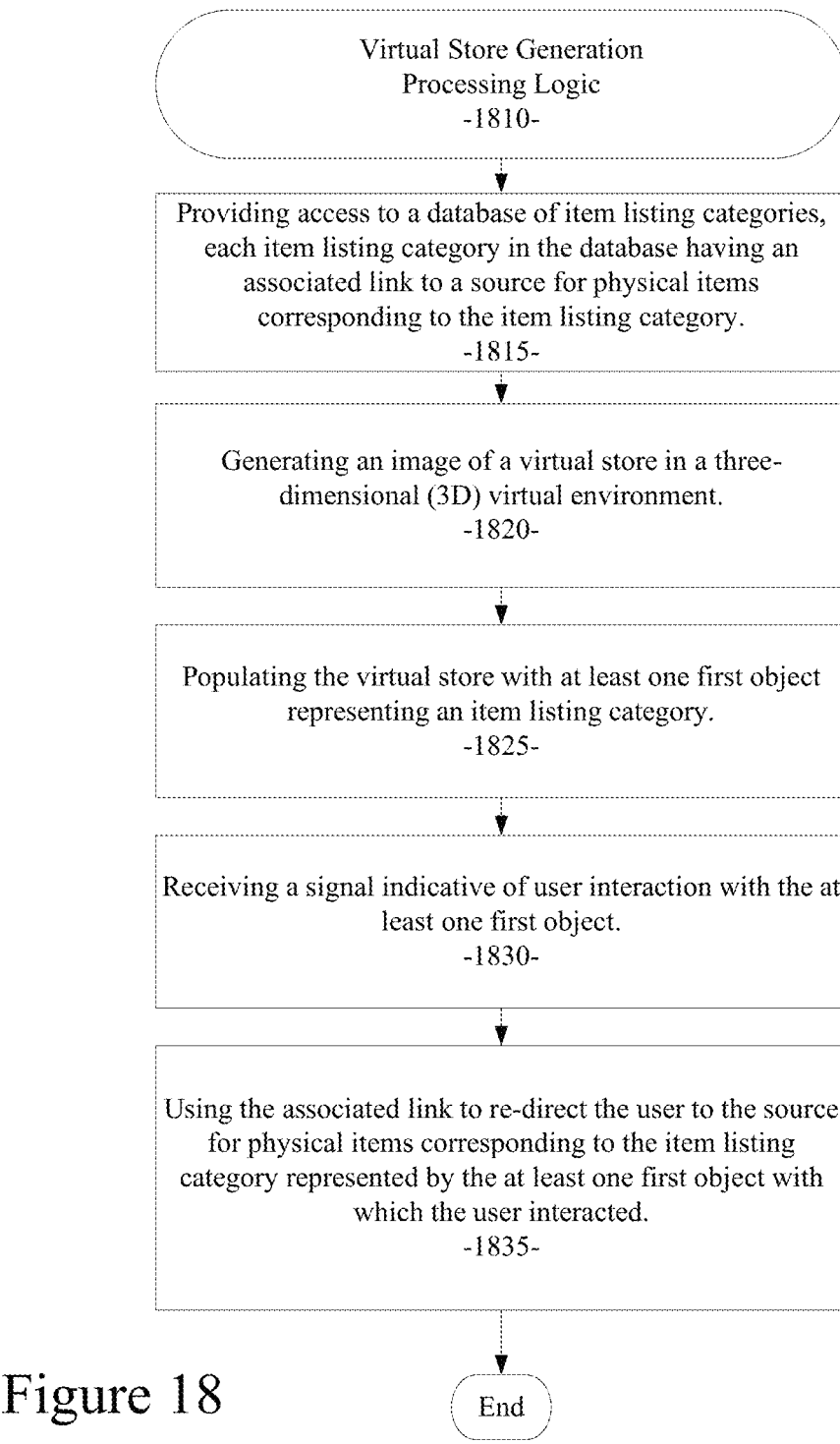
FIGS. 18 and 19 illustrate processing flow diagrams for example embodiments.
Figure 19:
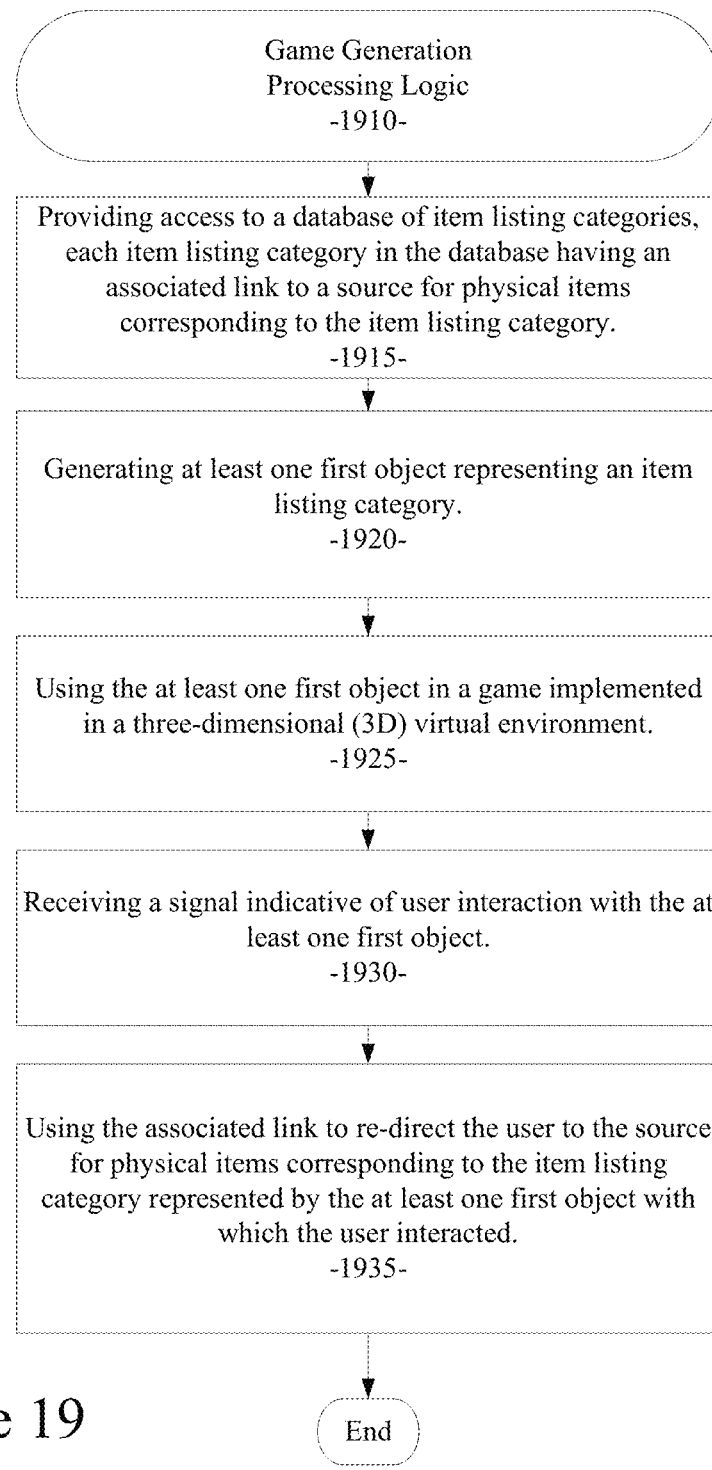

FIGS. 18 and 19 illustrate processing flow diagrams for example embodiments. Referring to FIG. 18, a processing flow for virtual store generation in an example embodiment is shown. The method of an example embodiment includes: providing access to a database of item listing categories, each item listing category in the database having an associated link to a source for physical items corresponding to the item listing category (processing block 1815); generating an image of a virtual store in a three-dimensional (3D) virtual environment (processing block 1820); populating the virtual store with at least one first object representing an item listing category (processing block 1825); receiving a signal indicative of user interaction with the at least one first object (processing block 1830); and using the associated link to re-direct the user to the source for physical items corresponding to the item listing category represented by the at least one first object with which the user interacted (processing block 1835).

Referring to FIG. 19, a processing flow for game generation in an example embodiment is shown. The method of an example embodiment includes: providing access to a database of item listing categories, each item listing category in the database having an associated link to a source for physical items corresponding to the item listing category (processing block 1915); generating at least one first object representing an item listing category (processing block 1920); using the at least one first object in a game implemented in a three-dimensional (3D) virtual environment (processing block 1925); receiving a signal indicative of user interaction with the at least one first object (processing block 1930); and using the associated link to re-direct the user to the source for physical items corresponding to the item listing category represented by the at least one first object with which the user interacted (processing block 1935).

Example Three-Tier Software Architecture

In some embodiments, the described methods may be implemented using one a distributed or non-distributed software application designed under a three-tier architecture paradigm. Under this paradigm, various parts of computer code (or software) that instantiate or configure components or modules may be categorized as belonging to one or more of these three tiers. Some embodiments may include a first tier as an interface (e.g., an interface tier). Further, a second tier may be a logic (or application) tier that performs application processing of data inputted through the interface level. The logic tier may communicate the results of such processing to the interface tier, and/or to a backend, or storage tier. The processing performed by the logic tier may relate to certain rules, or processes that govern the software as a whole. A third, storage tier, may be a persistent storage medium, or a non-persistent storage medium. In some cases, one or more of these tiers may be collapsed into another, resulting in a two-tier architecture, or even a one-tier architecture. For example, the interface and logic tiers may be consolidated, or the logic and storage tiers may be consolidated, as in the case of a software application with an embedded database. The three-tier architecture may be implemented using one technology, or, a variety of technologies. The example three-tier architecture, and the technologies through which it is implemented, may be realized on one or more computer systems operating, for example, as a standalone system, or organized in a server-client, peer-to-peer, distributed or so some other suitable configuration. Further, these three tiers may be distributed between more than one computer systems as various components.

Components

Example embodiments may include the above described tiers, and processes or operations about constituting these tiers may be implemented as components. Common too many of these components is the ability to generate, use, and manipulate data. The components, and the functionality associated with each, may form part of standalone, client, server, or peer computer systems. The various components may be implemented by a computer system on an as-needed basis. These components may include software written in an object-oriented computer language such that a component oriented, or object-oriented programming technique can be implemented using a Visual Component Library (VCL), Component Library for Cross Platform (CLX), Java Beans (JB), Java Enterprise Beans (EJB), Component Object Model (COM), Distributed Component Object Model (DCOM), or other suitable technique.

Software for these components may further enable communicative coupling to other components (e.g., via various Application Programming interfaces (APIs)), and may be compiled into one complete server, client, and/or peer software application. Further, these APIs may be able to communicate through various distributed programming protocols as distributed computing components.

Distributed Computing Components and Protocols

Some example embodiments may include remote procedure calls being used to implement one or more of the above described components across a distributed programming environment as distributed computing components. For example, an interface component (e.g., an interface tier) may form part of a first computer system that is remotely located from a second computer system containing a logic component (e.g., a logic tier). These first and second computer systems may be configured in a standalone, server-client, peer-to-peer, or some other suitable configuration. Software for the components may be written using the above described object-oriented programming techniques, and can be written in the same programming language, or a different programming language. Various protocols may be implemented to enable these various components to communicate regardless of the programming language used to write these components. For example, a component written in C++ may be able to communicate with another component written in the Java programming language through utilizing a distributed computing protocol such as a Common Object Request Broker Architecture (CORBA), a Simple Object Access Protocol (SOAP), or some other suitable protocol. Some embodiments may include the use of one or more of these protocols with the various protocols outlined in the Open Systems Interconnection (OSI) model, or Transmission Control Protocol/Internet Protocol (TCP/IP) protocol stack model for defining the protocols used by a network to transmit data.

A System of Transmission Between a Server and Client

Example embodiments may use the OSI model or TCP/IP protocol stack model for defining the protocols used by a network to transmit data. In applying these models, a system of data transmission between a server and client, or between peer computer systems may for example include five layers comprising: an application layer, a transport layer, a network layer, a data link layer, and a physical layer. In the case of software, for instantiating or configuring components, having a three tier architecture, the various tiers (e.g., the interface, logic, and storage tiers) reside on the application layer of the TCP/IP protocol stack. In an example implementation using the TCP/IP protocol stack model, data from an application residing at the application layer is loaded into the data load field of a TCP segment residing at the transport layer. This TCP segment also contains port information for a recipient software application residing remotely. This TCP segment is loaded into the data load field of an IP datagram residing at the network layer. Next, this IP datagram is loaded into a frame residing at the data link layer. This frame is then encoded at the physical layer, and the data transmitted over a network such as an internet, Local Area Network (LAN), Wide Area Network (WAN), or some other suitable network. In some cases, internet refers to a network of networks. These networks may use a variety of protocols for the exchange of data, including the aforementioned TCP/IP, and additionally ATM, SNA, SDI, or some other suitable protocol. These networks may be organized within a variety of topologies (e.g., a star topology), or structures.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
presenting, in a three-dimensional (3D) virtual environment, a 3D virtual store that includes a plurality of virtual objects, each respective object of the plurality of virtual objects associated with a respective item listing that has a respective mapping to a real-world source for a respective physical product;
connecting a first user of a plurality of users associated with the 3D virtual environment to an application associated with generating one or more tags for one or more objects of the plurality of virtual objects by connecting a first user application object associated with the first user to a main application object associated with managing the application;
connecting a second user of the plurality of users to the application by connecting a second user application object associated with the second user to the main application object;
displaying, to the first user and the second user by using the first user application object, the second user application object, and the main application object, an image associated with one of the plurality of virtual objects;
receiving a first input of one or more keywords associated with the image from the first user and a second input of one or more keywords associated with the image from the second user;
identifying one or more keywords from the first input and the second input that match;
assigning the one or more keywords that match as a tag corresponding to the one of the plurality of virtual objects associated with the image;
receiving a search query from a third user of the plurality of users associated with the 3D virtual environment;
causing display of, to the third user, search results that include the image in response to the search query matching the tag;
receiving a signal that indicates the third user has interacted with the image; and
re-directing the third user from the 3D virtual environment to a website corresponding to the real-world source for the respective physical product associated with the one of plurality of virtual objects based on the respective mapping.

2. The method of claim 1 further comprising causing display, to the third user, an item listing category associated with the image.

3. The method of claim 1 further comprising populating the 3D virtual store with at least one visual aid.

4. The method of claim 1 further comprising texturing at least one of the plurality of virtual objects.

5. The method of claim 1 further comprising associating a script with the one of the plurality of virtual objects associated with the image.

6. The method of claim 1 further comprising populating the 3D virtual store with at least one banner associated with initiating the application.

7. The method of claim 1 further comprising:
obtaining, using the main application object, the image from a server associated with the plurality of virtual objects; and
forwarding, using the main application object, the image to the first user application object and the second user application object.

8. The method of claim 1 wherein said connecting the first user to the application further comprises:
detecting the first user interacting with at least one of the plurality of virtual objects; and
performing said connecting the first user to the application in response to said detecting.

9. The method of claim 1, further comprising weighting the tag based on a frequency of how often the tag is used to correspond to the image; and
ranking the search results based on weighted tags.

10. The method of claim 9, further comprising:
maintaining a list of taboo words; and
restricting the first user or the second user from entering a taboo word included in the list of taboo words as the one or more keywords of the first input or the second input.

11. An apparatus comprising:
a processor system that implements:
a virtual store generator to present, in a three-dimensional (3D) environment, a 3D virtual store that includes a plurality of virtual objects, each respective object of the plurality of virtual objects associated with a respective item listing that has a respective mapping to a real-world source for a respective physical product;
an application generator to:
connect a first user of a plurality of users associated with the 3D virtual environment to an application associated with generating one or more tags for one or more objects in the plurality of virtual objects by connecting a first user application object associated with the first user to a main application object associated with managing the application;
connect a second user of the plurality of users to the application by connecting a second user application object associated with the second user to the main application object;
display, to the first user and the second user by using the first user application object, the second user application object, and the main application object, an image associated with one of the plurality of virtual objects;
receive a first input of one or more keywords associated with the image from the first user and a second input of one or more keywords associated with the image from the second user;
identify one or more keywords from the first input and the second input that match; and assign the one or more keywords that match as a tag corresponding to the one of the plurality of virtual objects associated with the image; and one or more server interfaces to:
receive a search query from a third user of the plurality of users associated with the 3D virtual environment;
cause display of, to the third user, search results that include the image in response to the search query matching the tag;
communicate a signal that indicates the third user has interacted with the image; and
re-direct the third user from the 3D virtual environment to a website corresponding to the real-world source for the respective physical product associated with the one of plurality of virtual objects based on the respective mapping.

12. The apparatus of claim 11 wherein the virtual store generator is further configured to present an item listing category in response to identifying user interaction with at least one of the plurality of virtual objects.

13. A non-transitory computer-readable medium including instructions that, responsive to execution by one or more processors of a machine, causes the machine to perform operations comprising:
causing, in a three-dimensional (3D) virtual environment, presentation of a 3D virtual store that includes a plurality of virtual objects, each respective object of the plurality of virtual objects associated with a respective item listing that has a respective mapping to a real-world source for a respective physical product;
connecting a first user of a plurality of users associated with the 3D virtual environment to an application associated with generating one or more tags for one or more objects of the plurality of virtual objects by connecting a first user application object associated with the first user to a main application object associated with managing the application;
connecting a second user of the plurality of users to the application by connecting a second user application object associated with the second user to the main application object;
causing display of, to the first user and the second user by using the first user application object, the second user application object, and the main application object, an image associated with one of the plurality of virtual objects;
receiving a first input of one or more keywords associated with the image from the first user and a second input of one or more keywords associated with the image from the second user;
identifying one or more keywords from the first input and the second input that match;
assigning the one or more keywords that match as a tag corresponding to the one of the plurality of virtual objects associated with the image;
receiving a search query from a third user of the plurality of users at the 3D virtual store;
causing display of, to the third user, search results that include the image in response to the search query matching the tag;
receiving a signal that indicates the third user has interacted with the image; and
re-directing the third user from the 3D virtual environment to a website corresponding to the real-world source for the respective physical product associated with the one of plurality of virtual objects based on the respective mapping.

14. The computer-readable medium of claim 13, wherein said operations further comprise:
detecting user interaction with the one of the plurality of virtual objects; and
causing display of, via a display object and to a user of the plurality of users that is associated with the user interaction, an item listing category associated with the one of the plurality of virtual objects.

15. The computer-readable medium of claim 13, wherein said causing display of the image further comprises communicating, using the main application object, with a server using a Hypertext Transfer Protocol (HTTP) request or HTTP query.

16. The computer-readable medium as recited in claim 15, wherein said operations further comprise receiving, via the main application object, a response from the server that includes at least one of:
a Universal Resource Locator (URL) associated with the image;
an image identifier (ID) associated with the image; or
taboo words that are restricted keywords.

17. The computer-readable medium of claim 13, wherein said assigning the one or more keywords that match as the tag further comprises communicating, using the main application object, a request to update tag information to a server using a Hypertext Transfer Protocol (HTTP).

18. The computer-readable medium of claim 13, wherein said operations further comprise:
detecting an end to the application;
sending an alert to the first user application object or the second user application object that the application has ended; and
forwarding, using the main application object, application information associated with the first user or the second user to a server.

19. The computer-readable medium of claim 13, wherein said operations further comprise:
detecting the first user has interacted with the first user application object; and
performing said connecting the first user to the application based on said detecting.

20. The computer-readable medium of claim 13, wherein said re-directing the third user to the website further comprises:
identifying an item list category associated with the one of the plurality of virtual objects; and
re-directing the third user to a website that is a source for one or more physical products corresponding to the item listing category.

* * * * *